(12) United States Patent
Frattura

(10) Patent No.: US 7,580,403 B2
(45) Date of Patent: Aug. 25, 2009

(54) STATUS TRANSMISSION SYSTEM AND METHOD

(75) Inventor: David E. Frattura, New York, NY (US)

(73) Assignee: Enterasys Networks, Inc., Andover, MA (US)

(*) Notice: Subject to any disclaimer, the term of this patent is extended or adjusted under 35 U.S.C. 154(b) by 866 days.

(21) Appl. No.: 11/066,607

(22) Filed: Feb. 25, 2005

(65) Prior Publication Data

US 2005/0195949 A1    Sep. 8, 2005

Related U.S. Application Data

(60) Provisional application No. 60/547,946, filed on Feb. 26, 2004, provisional application No. 60/552,323, filed on Mar. 11, 2004.

(51) Int. Cl.
*H04L 12/66* (2006.01)
(52) U.S. Cl. ...................... 370/352; 370/353
(58) Field of Classification Search ............. 370/352, 370/353, 230, 401
See application file for complete search history.

(56) References Cited

U.S. PATENT DOCUMENTS

| 4,627,052 A | 12/1986 | Hoare et al. |
|---|---|---|
| 4,734,907 A | 3/1988 | Turner |
| 4,823,338 A | 4/1989 | Chan et al. |
| 4,939,726 A | 7/1990 | Flammer et al. |
| 5,076,688 A | 12/1991 | Bowen et al. |
| 5,090,025 A | 2/1992 | Marshall et al. |
| 5,095,480 A | 3/1992 | Fenner |
| 5,132,926 A | 7/1992 | MacEachern et al. |
| 5,136,580 A | 8/1992 | Videlock et al. |
| 5,173,933 A | 12/1992 | Garner et al. |
| 5,243,652 A | 9/1993 | Teare et al. |
| 5,289,460 A | 2/1994 | Drake, Jr. et al. |
| 5,331,637 A | 7/1994 | Francis et al. |
| 5,355,371 A | 10/1994 | Auerbach et al. |
| 5,355,375 A | 10/1994 | Christensen |
| 5,361,256 A | 11/1994 | Doeringer et al. |
| 5,367,667 A | 11/1994 | Wahlquist |
| 5,394,402 A | 2/1995 | Ross |
| 5,396,493 A | 3/1995 | Sugiyama |
| 5,400,326 A | 3/1995 | Smith |
| 5,428,615 A | 6/1995 | Backes et al. |

(Continued)

FOREIGN PATENT DOCUMENTS

EP    1154624    11/2001

(Continued)

OTHER PUBLICATIONS

"802.1 Plenary Meeting Agenda," IEEE 802.1 Meeting, LaJolla, CA, Mar. 11, 1996.

(Continued)

*Primary Examiner*—Creighton Smith
(74) *Attorney, Agent, or Firm*—Holland & Knight LLP; Brian J. Colandreo, Esq.

(57) ABSTRACT

A method includes receiving, on a first network device, an announcement message from an endpoint device connected to the first network device via a network connection. The announcement message, which includes at least one connection criteria, is transmitted to one or more downstream network devices.

24 Claims, 3 Drawing Sheets

U.S. PATENT DOCUMENTS

| | | |
|---|---|---|
| 5,434,855 A | 7/1995 | Perlman et al. |
| 5,442,633 A | 8/1995 | Perkins et al. |
| 5,444,702 A | 8/1995 | Burnett et al. |
| 5,448,565 A | 9/1995 | Chang et al. |
| 5,475,781 A | 12/1995 | Chang et al. |
| 5,481,540 A | 1/1996 | Huang |
| 5,485,455 A | 1/1996 | Dobbins et al. |
| 5,491,694 A | 2/1996 | Oliver et al. |
| 5,500,860 A | 3/1996 | Perlman et al. |
| 5,506,838 A | 4/1996 | Flanagan |
| 5,511,168 A | 4/1996 | Perlman et al. |
| 5,517,494 A | 5/1996 | Green |
| 5,517,620 A | 5/1996 | Hashimoto et al. |
| 5,519,760 A | 5/1996 | Borkowski et al. |
| 5,521,910 A | 5/1996 | Matthews |
| 5,530,703 A | 6/1996 | Liu et al. |
| 5,550,816 A | 8/1996 | Hardwick et al. |
| 5,553,083 A | 9/1996 | Miller |
| 5,583,861 A | 12/1996 | Holden |
| 5,606,602 A | 2/1997 | Coyle et al. |
| 5,608,726 A | 3/1997 | Virgile |
| 5,613,069 A | 3/1997 | Walker |
| 5,621,793 A | 4/1997 | Bednarek et al. |
| 5,634,011 A | 5/1997 | Auerbach et al. |
| 5,640,452 A | 6/1997 | Murphy |
| 5,659,617 A | 8/1997 | Fischer |
| 5,675,582 A | 10/1997 | Hummel et al. |
| 5,684,800 A | 11/1997 | Dobbins et al. |
| 5,727,057 A | 3/1998 | Emery et al. |
| 5,734,865 A | 3/1998 | Yu |
| 5,740,171 A | 4/1998 | Mazzola et al. |
| 5,742,604 A | 4/1998 | Edsall et al. |
| 5,745,685 A | 4/1998 | Kirchner et al. |
| 5,752,003 A | 5/1998 | Hart |
| 5,754,657 A | 5/1998 | Schipper et al. |
| 5,757,916 A | 5/1998 | MacDoran et al. |
| 5,781,726 A | 7/1998 | Pereira |
| 5,781,737 A | 7/1998 | Schmidt |
| 5,790,074 A | 8/1998 | Rangedahl et al. |
| 5,812,819 A | 9/1998 | Rodwin |
| 5,825,772 A | 10/1998 | Dobbins et al. |
| 5,862,338 A | 1/1999 | Walker et al. |
| 5,874,964 A | 2/1999 | Gille |
| 5,881,236 A | 3/1999 | Dickey |
| 5,892,451 A | 4/1999 | May et al. |
| 5,892,910 A | 4/1999 | Safadi |
| 5,892,912 A | 4/1999 | Suzuki et al. |
| 5,898,686 A | 4/1999 | Virgile |
| 5,905,779 A | 5/1999 | Steinmetz |
| 5,920,699 A | 7/1999 | Bare |
| 5,922,073 A | 7/1999 | Shimada |
| 5,963,556 A | 10/1999 | Varghese et al. |
| 5,983,364 A | 11/1999 | Botcosh |
| 5,999,126 A | 12/1999 | Ito |
| 6,005,864 A | 12/1999 | Krause |
| 6,006,259 A | 12/1999 | Adelman et al. |
| 6,012,088 A | 1/2000 | Li et al. |
| 6,018,771 A | 1/2000 | Hayden |
| 6,035,105 A | 3/2000 | McCloghrie et al. |
| 6,041,166 A | 3/2000 | Hart et al. |
| 6,044,400 A | 3/2000 | Golan et al. |
| 6,061,797 A | 5/2000 | Jade et al. |
| 6,070,079 A | 5/2000 | Kuwahara |
| 6,076,114 A | 6/2000 | Wesley |
| 6,078,957 A | 6/2000 | Adelman et al. |
| 6,085,243 A | 7/2000 | Fletcher et al. |
| 6,094,434 A | 7/2000 | Kotzur et al. |
| 6,105,027 A | 8/2000 | Schneider et al. |
| 6,105,064 A | 8/2000 | Davis et al. |
| 6,108,365 A | 8/2000 | Rubin et al. |
| 6,115,754 A | 9/2000 | Landgren |
| 6,122,664 A | 9/2000 | Boukobza et al. |
| 6,130,890 A | 10/2000 | Leinwand et al. |
| 6,131,120 A | 10/2000 | Reid |
| 6,151,324 A | 11/2000 | Belser et al. |
| 6,151,631 A | 11/2000 | Ansell et al. |
| 6,157,647 A | 12/2000 | Husak |
| 6,167,275 A | 12/2000 | Oros et al. |
| 6,167,513 A | 12/2000 | Inoue et al. |
| 6,192,045 B1 | 2/2001 | Williams |
| 6,192,403 B1 | 2/2001 | Jong et al. |
| 6,201,789 B1 | 3/2001 | Witkowski et al. |
| 6,205,126 B1 | 3/2001 | Moon |
| 6,212,391 B1 | 4/2001 | Saleh et al. |
| 6,216,159 B1 | 4/2001 | Chintakrindi et al. |
| 6,222,840 B1 | 4/2001 | Walker et al. |
| 6,230,018 B1 | 5/2001 | Watters et al. |
| 6,233,242 B1 | 5/2001 | Mayer et al. |
| 6,236,365 B1 | 5/2001 | LeBlanc et al. |
| 6,256,338 B1 | 7/2001 | Jalloul et al. |
| 6,259,404 B1 | 7/2001 | Parl et al. |
| 6,273,622 B1 | 8/2001 | Ben-David |
| 6,286,044 B1 | 9/2001 | Aoyama et al. |
| 6,304,218 B1 | 10/2001 | Sugiura et al. |
| 6,308,273 B1 | 10/2001 | Goertzel et al. |
| 6,317,500 B1 | 11/2001 | Murphy |
| 6,327,474 B1 | 12/2001 | Ruutu et al. |
| 6,327,535 B1 | 12/2001 | Evans et al. |
| 6,343,317 B1 | 1/2002 | Glorikian |
| 6,363,422 B1 | 3/2002 | Hunter et al. |
| 6,370,629 B1 | 4/2002 | Hastings et al. |
| 6,388,618 B1 | 5/2002 | Stilp et al. |
| 6,421,009 B2 | 7/2002 | Suprunov |
| 6,442,394 B1 | 8/2002 | Valentine et al. |
| 6,442,616 B1 | 8/2002 | Inoue et al. |
| 6,453,237 B1 | 9/2002 | Fuchs et al. |
| 6,456,853 B1 | 9/2002 | Arnold |
| 6,460,084 B1 | 10/2002 | Van Horne et al. |
| 6,466,786 B1 | 10/2002 | Wallenius |
| 6,480,495 B1 | 11/2002 | Mauger et al. |
| 6,523,064 B1 | 2/2003 | Akatsu et al. |
| 6,539,229 B1 | 3/2003 | Ali |
| 6,542,813 B1 | 4/2003 | Kovacs |
| 6,556,831 B1 | 4/2003 | Buppelmann |
| 6,580,914 B1 | 6/2003 | Smith |
| 6,583,713 B1 | 6/2003 | Bates |
| 6,640,184 B1 | 10/2003 | Rabe |
| 6,640,248 B1 | 10/2003 | Jorgensen |
| 6,665,715 B1 | 12/2003 | Houri |
| 6,701,864 B2 | 3/2004 | Watson et al. |
| 6,716,101 B1 | 4/2004 | Meadows et al. |
| 6,741,863 B1 | 5/2004 | Chiang et al. |
| 6,757,545 B2 | 6/2004 | Nowak et al. |
| 6,757,740 B1 | 6/2004 | Parekh et al. |
| 6,771,639 B1 | 8/2004 | Holden |
| 6,778,818 B1 | 8/2004 | O'Neil |
| 6,795,688 B1 | 9/2004 | Plasson et al. |
| 6,799,049 B1 | 9/2004 | Zellner et al. |
| 6,807,427 B1 | 10/2004 | Sakamoto et al. |
| 6,813,501 B2 | 11/2004 | Kinnunen et al. |
| 6,826,385 B2 | 11/2004 | Kujala |
| 6,826,617 B1 | 11/2004 | Ansell et al. |
| 6,834,195 B2 | 12/2004 | Brandenberg et al. |
| 6,859,791 B1 | 2/2005 | Spagna et al. |
| 6,889,051 B2 | 5/2005 | Ogino et al. |
| 6,889,053 B1 | 5/2005 | Chang et al. |
| 6,920,329 B2 | 7/2005 | Kennedy et al. |
| 6,934,548 B1 | 8/2005 | Gould et al. |
| 6,937,988 B1 | 8/2005 | Hemkumar et al. |
| 6,938,096 B1 | 8/2005 | Greschler et al. |
| 6,983,313 B1 | 1/2006 | Korkea-Aho |
| 6,985,731 B1 | 1/2006 | Johnson et al. |
| 7,010,583 B1 | 3/2006 | Aizono et al. |
| 7,089,014 B2 * | 8/2006 | Brown et al. ................ 455/450 |

| | | | |
|---|---|---|---|
| 7,089,264 B1 | 8/2006 | Guido et al. | |
| 7,120,449 B1 | 10/2006 | Muhonen et al. | |
| 7,136,915 B2 | 11/2006 | Rieger, III | |
| 7,139,820 B1 | 11/2006 | O'Toole et al. | |
| 7,197,556 B1 | 3/2007 | Short et al. | |
| 7,245,609 B2* | 7/2007 | D'Eletto | 370/352 |
| 7,263,095 B1* | 8/2007 | Sarkar | 370/352 |
| 7,266,839 B2 | 9/2007 | Bowers et al. | |
| 7,366,157 B1* | 4/2008 | Valentine et al. | 370/352 |
| 7,383,347 B2* | 6/2008 | Ebling et al. | 709/232 |
| 7,447,765 B2* | 11/2008 | Aerrabotu et al. | 709/224 |
| 2001/0022558 A1 | 9/2001 | Karr, Jr. et al. | |
| 2001/0039623 A1 | 11/2001 | Ishikawa | |
| 2002/0010866 A1 | 1/2002 | McCullough et al. | |
| 2002/0016831 A1 | 2/2002 | Peled et al. | |
| 2002/0023010 A1 | 2/2002 | Rittmaster et al. | |
| 2002/0034953 A1 | 3/2002 | Tricarico | |
| 2002/0046073 A1 | 4/2002 | Indseth et al. | |
| 2002/0051540 A1 | 5/2002 | Glick et al. | |
| 2002/0052180 A1 | 5/2002 | Ravishankar et al. | |
| 2002/0062379 A1 | 5/2002 | Widegren et al. | |
| 2002/0063656 A1 | 5/2002 | Gutowski | |
| 2002/0101860 A1* | 8/2002 | Thornton et al. | 370/352 |
| 2002/0107029 A1 | 8/2002 | Caughran et al. | |
| 2002/0122055 A1 | 9/2002 | Parupudi et al. | |
| 2002/0138632 A1 | 9/2002 | Bade et al. | |
| 2002/0164996 A1 | 11/2002 | Dorenbosch | |
| 2002/0188842 A1 | 12/2002 | Willeby | |
| 2003/0035544 A1 | 2/2003 | Herle et al. | |
| 2003/0041167 A1 | 2/2003 | French et al. | |
| 2003/0065571 A1 | 4/2003 | Dutta | |
| 2003/0095509 A1 | 5/2003 | Ramanan et al. | |
| 2003/0185233 A1 | 10/2003 | Ji et al. | |
| 2003/0208523 A1 | 11/2003 | Gopalan et al. | |
| 2004/0064334 A1 | 4/2004 | Nye | |
| 2005/0199792 A1 | 9/2005 | Argast et al. | |

FOREIGN PATENT DOCUMENTS

| | | |
|---|---|---|
| WO | 94/28683 | 12/1994 |
| WO | 97/05749 | 2/1997 |
| WO | 97/41654 | 11/1997 |
| WO | 98/19482 | 5/1998 |
| WO | 00/22862 | 4/2000 |
| WO | 00/44149 | 7/2000 |
| WO | 00/67450 | 11/2000 |
| WO | 00/69198 | 11/2000 |
| WO | 01/08425 | 2/2001 |
| WO | 01/22656 | 3/2001 |
| WO | 01/69956 | 9/2001 |
| WO | 01/76093 | 10/2001 |
| WO | 01/82259 | 11/2001 |
| WO | 01/94967 | 12/2001 |
| WO | 01/95505 | 12/2001 |
| WO | 02/09456 | 1/2002 |
| WO | 02/12914 | 2/2002 |

OTHER PUBLICATIONS

"802.1 Resolution on Progress of VLAN work," Jul. 1995, IEEE.
"802.1Thursday Agenda," IEEE 802.1 Meeting, University of Twente, Enschede, Netherlands, Jul. 11, 1996.
"Attachments Passed by Working Group 802.1," IEEE 802.1, Nov. 1995.
"Clearpoint Demonstrates Frame Relay Support In Interop Frame Relay Solutions Showcase," Clearpoint, Press Release dated Sep. 23, 1991.
"Closing Plenary Minutes," IEEE 802.1 Meeting, LaJolla, CA, Mar. 14, 1996.
"Constellation Product Schedule," Apr. 22, 1992.
"Cyberlocator: A new Dimension in Network Security," retrieved from www.cyberlocator.com, Jul. 2002.
"End Station Tagging Presentation," Presentation Jun. 1996.
"Geographic Location/Privacy (geopriv)" retrieved from www.ietf.org, Jul. 2002.
"Geolocation Service Allows Web Sites to Identify Users' Geographic Locations," Business Geographics, May 2001.
"IEEE 802.1 1995 Document Register," IEEE, 1995.
"IEEE 802.1 Session Notes," IEEE 802.1 Meeting, Jul. 8, 1996 through Jul. 11, 1996.
"IEEE 802.1 Working Group, Minutes of the Mar. 1995 Meeting," West Palm Beach Florida, Mar. 1995.
"IEEE Standards for Local and Metropolitan Area Networks: Media Access Control (MAC) Bridges," IEEE, Technical Committee on Computer Communications of the IEEE Computer Society, Mar. 8, 1991, pp. 1-176.
"IEEE Standards for Local and Metropolitan Area Networks: Overview and Architecture," IEEE, Technical Committee on Computer Communications of the IEEE Computer Society, Dec. 21, 1990, pp. 1-31.
"Instructions to the Editor for P802.1j, and Ballot Summary," Jul. 12, 1995, P802.1-95/008, IEEE.
"Instructions to the Editor for the revision of Overview and Architecture," Jul. 12, 1995, P802.1-95/007, IEEE.
"Internet Protocol," DARPA Internet Program Protocol Specification: RFC 791, Sep. 1981, pp. 1-45.
"IP Multicast Streamlines Delivery of Multicast Applications," The Packet: Cisco Systems Use Magazine, V.7, No. 1, 1995.
"LAN Emulation over ATM Version 1.0," The ATM Forum Technical Committee, af-lane-0021.000, Jan. 1995, pp. 1-141.
"Location Pattern Matching & The RadioCamera Network," US Wireless 2001.
"Location Technologies for GSM, GPRS and WCDMA Networks," SnapTrack, White Paper, Nov. 2001.
"Multiprotocol Routing—From Constellation," Clearpoint Research Corporation, 1992.
"New Cisco IOS VLAN Services Make 'Virtual' a Reality," Cisco VLAN Roadmap, Dec. 9, 1996.
"Newbury Networks Debuts First Location-Enabled Networks Solutions for 802.11B WLANS," retrieved from www.newburynetworks.com/newsroom.presslist.php?start=5, Sep. 2001.
"Proposed comments on ISO/IEC 10038/PDAM 2," Jul. 12, 1995, P802.1-95/009, IEEE.
"Proposed Comments on ISO/IEC 15802-5/PDAM 1," Jul. 12, 1995, P802.1-95/010, IEEE.
"Quick VLAN Standardization," IEEE 802.1 Meeting, Ottowa, Oct. 2, 1996.
"Real Time Location Systems and Wireless Local Area Networking: Combining Technologies for Optimum Asset Visibility and Supply Chain Management," Apr. 2001.
"Reliacast to Offer Enhanced Geographic Content Distribution Management Through Partnership with Quova," Mar. 6, 2001.
"Slithernet: A Proposal for Using Moderate-To-High-Speed Synchronous Serial Connections as a LAN-like Networking Medium", Jul. 1991.
"SpotON: Ad-hoc Location Sensing," retrieved from www.portolano.cs.washington.edu/projects/spoton, Jul. 2002.
"TCP-IP Distribution List for Nov. 1991," The Security Digest Archives, Nov. 1991.
"The Richochet Wireless Network Overview," retrieved from http://www.ricochet.net/ricochet/, 1997.
"Virtual LAN Communications," Cisco VLAN Roadmap—White Paper, Dec. 9, 1996.
"Virtual LANs Find a Use for Selective Flooding," Network World, Apr. 10, 1995, V.12, No. 15, p. 54.
"Virtual LANs Get Real," Data Communications, Feb. 1995, pp. 87-96.
"Virtual LANs Near Reality," Data Communications, Jul. 1995, p. 16.
"VisualRoute—Visual Traceroute Utility/Locate Internet Abusers," retrieved from www.visualware.com/visualroute/index/html, Jul. 2002.
Aggarwal, Sudhir, and Raghav, Amritansh, "Dualcast: A Scheme for Reliable Multicasting," IEEE, Apr. 1994, pp. 15-22.
Aguilar, Lorenzo, "Datagram Routing for Internet Multicasting," ACM, 1994, pp. 58-63.

Ahmadi, Hamid, and Denzel, Wolfgang E., "A Survey of Modern High-Performance Switching Techniques," IEEE Journal on Selected Areas in Communications, V.7, No. 7, Sep. 1989, pp. 1091-1103.

Aiello, Rosario, et al., "Casual Ordering in Reliable Group Communications," ACM SIGCOMM, 1993, pp. 106-115.

Almquist, P., and Kastenholz, F., "Towards Requirements for IP Routers," Network Working Group RFC 1716 Memo, Nov. 1994, pp. 1-172.

Alonge, Ken, "Revision to SDE," Email dated Nov. 13, 1995.

Amir and Balakrishnan, "An Evaluation of the Metricom Richochet Wireless Network," U.C. Berkeley, May 1996.

Anderson, Jens Kristian, "Virtual LANs Take Network To Next Level," Computer Technology Review, Sep. 1996, pp. 12-14.

Armstrong, S., et al., "Multicast Transport Protocol," Network Working Group—RFC 1301 Memo, Feb. 1992, pp. 1-36.

Autolitano, A., et al., "Application of Generalized Parallel Delta Networks to a Hybrid Broadband Switch," IEEE 1989, pp. 123-127.

Axner, David H., "Differing Approaches to Virtual LANs," Business Communications Review, V. 23, No. 12, Dec. 1993, pp. 42-45.

Backes, Floyd, "An Architectural Framework for VLAN Standardization in IEEE 802," IEEE Presentation, Milpitas, CA, Jan. 24, 1996.

Backes, Floyd, "Spanning Tree Bridges; Transparent Bridges for Interconnection of IEEE 802 LANs," IEEE Network, V.2, No. 1, Jan. 1988, pp. 5-9.

Bagwell, Richard T., et al., "A Comparison of Native ATM-Multicast to IP-Multicast With Emphasis on Mapping Between the Two," IEEE, 1995, pp. 189-193.

Bahl and Padmanabhan, "RADAR: An In-Building RF-based User Location and Tracking System," Proc. IEE Infocom 2000, Mar. 2000.

Bahl, Padmanabhan, and Balachandran, "A Software System for Locating Mobile Users: Design, Evaluation, and Lessons," Apr. 2000.

Bahl, Padmanabhan, and Balachandran, "Enhancements to the RADAR User Location and Tracking System," Microsoft Research Technical Report, MSR-TR-2000-12, Feb. 2000.

Balboni, Gian Paolo, et al., "An ATM Switching Testbed," Jul.-Aug. 1991.

Ballardie, Tony, et al., "Multicast-Specific Security Threats and Counter Measures," IEEE 1995, pp. 2-16.

Ballardie, Tony, et al., "Core Based Trees (CBT)—An Architecture for Scalable Inter-Domain Multicast Routing," ACM SIGCOMM, 1993, pp. 85-95.

Bament, Sally, "Why You Should Consider INPs as a Viable Internetworking Solution," Telecommunications, V.27, No. 2, Feb. 1993, pp. 54-57.

Bartlett, John, "Embedded VLAN Tagging," IEEE 802.1 Meeting Presentation, LaJolla, CA, Mar. 12, 1996.

Bartlett, John, "Media or Network Based VLANs?," IEEE 802.1 VLAN Meeting Presentation, LaJolla, CA, Mar. 12, 1996.

Barton and Kindberg, "The Challenges and Opportunities of Integrating the Physical World and Networked Systems," Hewlett Packard Laboratories, HPL-2001-18, Jan. 24, 2001.

Bennett, Geoff, "Routing in the Virtual LAN," Telecommunications, V. 29, No. 7, Jul. 1995, pp. 33, 69-72.

Bernabei, Francisco, et al., "A Fully Distributed Routing Control Scheme in an ATM Switch," IEEE, 1990, pp. 766-770.

Birman, Ken, "A Response to Cheriton's and Skeen's Criticism of Causal and Totally Ordered Communication," Department of Computer Science, Cornell University, Oct. 21, 1993, pp. 11-21.

Birman, Kenneth P., and Joseph, Thomas A., "Reliable Communication in the Presence of Failures," ACM Transactions on Computer Systems, V.5, No. 1, Feb. 1987, pp. 47-76.

Birman, Kenneth, et al., "Design Alternatives for Process Group Membership and Multicast," NTIS, Department of Computer Science—Cornell University, Dec. 1991, pp. 1-31.

Blazevic et al., "Self-organization in Mobile Ad-Hoc Networks: The Approach of Terminodes," IEEE Comm. Mag. 2001.

Boggs, David Reed, "Internet Broadcasting," Dissertation—Stanford University Graduate Studies, University Microfilms International, Jan. 1982, pp. 1-86.

Bolot, Jean-Chrysostome, et al. "Scalable Feedback Control for Multicast Video Distribution in the Internet," ACM SIGCOMM, 1994, pp. 58-67.

Braden, R., "TCP Extensions for High Performance: An Update," Jun. 21, 1993.

Braden, R., and Postel, J., "RFC 1009—Requirements for Internet Gateways," Jun. 1987, pp. 1-55.

Braden, Robert, "Requirements for Internet Hosts—Communication Layers," Internet Engineering Task Force—RFC 1122, Oct. 1989, pp. 1-115.

Brakmo et al., "TCP Vegas: New Technologies for Congestion Detection and Avoidance," Dept. of Computer Science, University of Arizona, Tucson, AZ, 1996.

Braudes, R., and Zabele, S., "Requirements for Multicast Protocols," Network Working Group RFC 1458 Memo, May 1993, pp. 1-18.

Bulusu, Heidermann and Estrin, "GPS-less Low Cost Outdoor Localization for Very Small Devices," Univ. S. California, Apr. 2000.

Bunn, J.J., "Trip Report: DECworld," unpublished, May 18, 1992, pp. 1-11.

Caffery and Stuber, "Overview of Radiolocation in CDMA Cellular Systems," IEEE Communications Magazine, Apr. 1998, pp. 38-45.

Caffery and Stuber, "Subscriber Location in CDMA Cellular Networks," IEEE Trans Veh. Tech. vol. 47, May 1997.

Casner, Steve, "Frequently Asked Questions (FAQ) on the Multicast Backbone (MBONE)," Memo dated Dec. 22, 1994.

Catlin, Jeff, "VLAN," Email dated Nov. 22, 1995.

Challenges for Mesh Networks in UWB Applications, UWB Insider 2004 [retrieved Dec. 1, 2006] from the Internet: <URL: www.uwbinsider.com/technology/print/1_8_mesh_challenges.html>.

Chambers, Alan M. "IP multicast, Floyd Backes's Presentation, Denver," Email dated Nov. 1, 1995.

Chambers, Alan M. "Re: VLAN Ad Hoc Group," Email dated Jun. 14, 1995.

Chambers, Alan, "Mapping the Problem Space," Jul 9, 1996.

Chan, Cheung-Win, And Yum, Tak-Shing, "An Algorithm for Detecting and Resolving Store-and-Foward Deadlocks in Packet-Switched Networks," IEEE Transactions on Communications, V.Com-35, No. 8, Aug. 1987, pp. 801-807.

Chen and Lin, "Route Optimization and Location Updates for Mobile Hosts," 16th IEEE Int. Conf. on Dist. Comp. Sys., May 1996.

Chen, Helen, et al., "Evaluation of DEC's Gigaswitch for Distributed Parallel Computing," Supersedes-SAND93-8013, Oct. 1993.

Chen, Xing, and Hayes, Jeremiah F., "Access Control in Multicast Packet Switching," IEEE/ACM Transactions on Networking, V.1, No. 6, Dec. 1993, pp. 638-649.

Cheriton, David R. "Virtual LAN Management Protocol (VLMP) Draft RFC," Stanford University and Granite Systems, Inc., Oct. 20, 1995.

Cheriton, David R., and Deering, Stephen E., "Host Groups: A Multicast Extension for Datagram Internetworks," Proceedings Ninth Data Computer Symposium, Sep. 10-13, 1985, pp. 172-179.

Cheriton, David R., and Williamson, Carey L., "VMTP as the Transport Layer for High-Performance Distributed Systems," IEEE Communications Magazine, Jun. 1989, pp. 37-44.

Cheriton, David R., and Zwaenepoel, Willy, "Distributed Process Groups in the V Kernel," ACM Transactions on Computer Systems, V.3, No. 2, May 1985, pp. 77-107.

Cheriton, David R., et al., "Ethernet Group Membership Protocol (EGMP) Draft RFC," Stanford University and Granite Systems, Oct. 12, 1995.

Cisco VPN Routers, Cisco Systems, Inc. (1992-20001).

Cisco VPN Solutions, Cisco Systems, Inc. (2001).

Cohen, Jodi, "Critics Take Issue With Fuzzy VLAN Standards Work," Network World, Oct. 30, 1995, V.12, No. 44, pp. 1, 84.

Cohen, Jodi, "Opposing Virtual LAN Views," Network World, Oct. 28, 1996, V.13, No. 44, p. 75.

Cohen, Jodi, "The Truth About Virtual LANs," Network World, Oct. 28, 1996, V.13, No. 44, pp. 1,74.

Cohen, Jodi, "Too Small for VLANs," Network World, Nov. 4, 1996, V.13, No. 45, p. 31.

Conner, Krishnamurthy and Want, "Making Everyday Life Easier Using Dense Sensor Networks," Springer, 2001.

Connery, Glenn, "Re: VLAN Questions/Suggestions," Email dated May 6, 1996.
Corson and Macker, "Mobile As hoc Networking (MANET): Routing Protocal Performance Issues and Evaluation Considerations," Jan. 1999.
Cullerot, David, "Requirements for VLANs," 802.1 Interim Meeting, Oct. 1995, Cabletron Systems, Inc.
Cullerot, David, "Virtual LAN Topology," 802.1 Interim Meeting, Oct. 13, 1995, Cabletron Systems, Inc.
Cullerot, David, "VLAN Topology", 802.1 Interim Meeting, Oct. 13, 1995, Cabletron Systems, Inc.
Daviel, Internet Draft entitled, "Geographic Extensions for HTTP transactions," Apr. 2001.
Davis et al., "A Means for Expressing Location Information in the Domain Name System," Jan. 1996.
De Zhong, Wen, et al., "A Copy Network with Shared Buffers for Large-Scale Multicast ATM Switching," IEEE/ACM Transactions on Networking, V.1, No. 2, Apr. 1993, pp. 157-165.
Deering, S., "RFC 1112—Host Extensions for IP Multicasting," Aug. 1989.
Deering, S., and Hinden, R., "RFC 2460—Internet Protocol, Version 6 (IPv6) Specification," RFC Archive, Dec. 1998 pp. 1-40.
Deering, S.E., "Host Extensions for IP Multicasting," Network Working Group—RFC 988 Memo, Jul. 1986, pp. 1-20.
Deering, Stephen E., "Multicast Routing in Internetworks and Extended LANs," SIGCOMM 88 Symposium, Communications, Architectures & Protocols, Stanford, CA, Aug. 16-19, 1988, pp. 55-64.
Deering, Stephen E., and Cheriton, David R., "Multicast Routing in Datagram Internetworks and Extended LANs," ACM Transactions on Computer Systems, V.8, No. 2, May 1990, pp. 85-110.
Deering, Stephen Edward, "Multicast Routing in a Datagram Internetwork," UMI Dissertation Services, Dec. 1991, pp. 1-137.
Deering, Stephen, et al., "An Architecture for Wide-Area Multicast Routing," ACM, Apr. 1994, pp. 126-134.
Denning et al. "Location-Based Authentication: Grounding Cyberspace for Better Security," 1996, Elsevier Science Ltd., pp. 1-6.
Derby, et al., "Scoping Multicasts in WAN Interconnected Local Networks," IBM Technical Disclosure Bulletin, Jan. 1992.
Drane, MacNaughton, and Scott, "Positioning GSM Telephones," IEEE Communications Magazine, Apr. 1998.
Duffy, Jim, "Routers' Role Changes as Both Switches, VLANs Come Into Play," Network World, Jun. 3, 1996, V.13, No. 23, p. 22.
Eriksson, Hans, "MBONE: The Multicast Backbone," Communications of the ACM, V.37, No. 8, Aug. 1994, pp. 54-60.
Erramilli, A., and Singh, R.P., "A Reliable and Efficient Multicast Protocol for Broadband Broadcast Networks," ACM, 1988, pp. 343-353.
Estrin, Deborah, and Wei, Liming, "Multicast Routing in Dense and Sparse Modes: Simulation Study of Tradeoffs and Dynamics," IEEE, Jul. 1995, pp. 150-157.
Fall et al., "Comparison of Tahoe, Reno, and Sack TCP," Lawrence Berkeley National Laboratory, Berkeley, CA, Dec. 2, 1995.
Feldmann, et al., "NetScope: Traffic Engineering for IP Networks," IEEE Network Mag. 2000.
Feltman, Charles, "A Reality Check on Virtual LANs," Business Communications Review, V.26, No. 7, Jul. 1996, p. 27.
Finn, Norman W., "External and Internal Addresses in Explicit Tags," Email dated Jan. 25, 1996.
Finn, Norman W., "Implicit vs. Explicit VLAN Frame Tagging," Email dated Jan. 25, 1996.
Finn, Norman W., "Re: 802.1 Interim Meeting—VLANs—Objectives, Contributions, Agenda," Email dated May 17, 1996.
Finn, Norman W., "Re: VLAN Questions/Suggestions," Email dated May 8, 1996.
Finn, Norman W., "Re: VLANs and IP Multicast," Email dated May 9, 1996.
Finn, Norman W., "Slides for External and Internal Addresses in Explicit Tags," Email dated Jan. 25, 1996.
Finn, Norman W., "Slides for Implicit vs. Explicit VLAN Frame Tagging," Email dated Jan. 25, 1996.
Finn, Norman W., "Two Models for VLAN Tagging," Email dated Mar. 8, 1996.
Finn, Norman, "Multiple Spanning Trees in 802.1Q," IEEE 802.1 Presentation, Sep. 26, 1996, pp. 1-11.
Floyd et al., "Increasing TCP's Initial Window," Jul. 1997.
Floyd, S., "Issues of TCP with SACK," Mar. 9, 1996.
Floyd, S., "TCP and Successive Fast Retransmits," Lawrence Berkeley Laboratory, Berkeley, CA May 1995.
Frantz, Paul, "Re: Re: Revision to SDE," Email dated Nov. 24, 1995.
Frantz, Paul, et al., "Proposed VLAN Service Definition," IEEE 802.1 Presentation, Denver, Oct. 13, 1995.
Gabber and Wool, "On Location-Restricted Services," IEEE Network, Nov./Dec. 1999.
Garcia-Molina, Hector, and Spauster, Annemarie, "Ordered and Reliable Multicast Communication," ACM Transactions on Computer Systems, V.9, No. 3, Aug. 1991, pp. 242-271.
Gessler and Jesse, "Advanced Location Modeling to Enable Sophisticated LBS Provisioning in 3G Networks," retrieved from www.teco.edu/locationws/9.pdf, Jul. 2002.
Gong, Li, and Shacham, Nachum, "Elements of Trusted Multicasting," IEEE, Apr. 1994, pp. 23-30.
Gopal, Inder, and Rom, Raphi, "Multicasting to Multiple Groups over Broadcast Channels," IEEE, 1988, pp. 79-81.
Greenfield, David, "A Realistic Approach to Virtual LANs," Data Communications, Feb. 1996, V.25, No. 2, pp. 50, 52.
Hain, T., Internet Drafts entitled "An IPv6 Provider-Independent Global Unicast Address Format," and "Application and Use of the IPv6 Provider Independent Global Unicast Format," Oct. 2001.
Hanks, S., "Generic Routing Encapsulation (GRE)," Oct. 1994.
Harris & Jeffries, Inc., " A Proposal for Software Development—for an IP-Router Facility," Proposal #910214.01, Feb. 19, 1991.
Harris, B., "Amulet: Approximate Mobile User Location Tracking System," Retrieved from www.winlab.rutgers.edu/~sachin/papers/papers.html, Jul. 2002.
Hart, John and Backes, Floyd, "IEEE 802 Virtual LANs (VLANs), Proposed Definition and Requirements," dated Jul. 10, 1995.
Hart, John, "Re: Re: Revision to SDE," Email dated Nov. 25, 1995.
Hausman, Richard and Ruby, Doug, "Application Requirements for Support of Duplicate Addresses in VLANs," Contribution to IEEE 802.1Q, Vancouver Plenary, Nov. 11, 1996.
Hausman, Richard, "Re: 802.1Q VLAN PAR Backwards Interoperability," Email dated Jun. 24, 1996.
Heidemann, J., "Using Geospatial Information in Sensor Networks," USC/Information Sciences Institute, Sep. 17, 2001.
Heywood, Drew, et al., "Enterprise Series Connectivity: Local Area Networks," 1992, pp. 327-353.
Hightower and Borriello, "A Survey and Taxonomy of Location Systems for Ubiquitous Computing," University of Washington Technical Report, UW-CSE 01-08-03, Aug. 24, 2001.
Hightower, Borriello, and Want, "SpotON: An indoor 3D Location Sensing Technology Based on RF Signal Strength,"University of Wisconsin CSE Technical Report #2000-02-02, Feb. 18, 2000.
Horowitz, Steve, "Priority Bits & First on the Wire Question," Email dated Jun. 25, 1996.
Horowitz, Steve, "Priority Bits Discussion," Email dated Jun. 7, 1996.
Horowitz, Steve, "VLAN Issues List," Email dated Jun. 7, 1996.
Housley, Russ, "Use of SDE to within VLAN Standard," Email dated Jan. 23, 1996.
Ideal Congestion Control, Sep. 1997.
Imielinski and Navas, "GPS-Based Addressing and Routing," Nov. 1996.
Interior Gateway Routing Protocol, Cisco Systems, Inc. (1999).
IP Sec, Cisco Systems, Inc. (1998).
Jacobson, V., "Design Changes to the Kernel Network Architecture for 4.4BSD," Lawrence Berkeley Laboratory, Berkeley, CA May 1992.
Jacobson, V., "Dynamic Congestion Avoidance/Control," email message, Feb. 1988.
Jacobson, V., "End2End," email message, Mar. 1994.
Jacobson, V., "Modified TCP Congestion Avoidance Algorith," email message, Apr. 1990.

Jacobson, V., "Re: Interpacket arrival variance and mean," email message, Jun. 15, 1987.
Jacobson, V., "Re: your congestion scheme," email message, Nov. 1987.
Jacobson, V., "Some Design Issues for High-Speed Networks," Lawrence Berkeley Laboratory, Berkeley, CA Nov. 1993.
Jacobson, V., "TCP Extensions for High Performance," email message, Feb. 1997.
Jacobson, V., "TCP Extensions for Long-Delay Paths," Oct. 1988.
Jeffree, Tony, "Brief Minutes of 802.1—Maui, Jul. 1995," IEEE 802.1 Maui, Jul. 1995.
Jeffree, Tony, "Input paper for July Meeting—Proposed changes to 802.1D Section 3," Email dated Jun. 22, 1995.
Jeffree, Tony, "Proposed Use of GARP for Distribution of VLAN Membership Information," Oct. 28, 1996.
Jeffree, Tony, "Re: Re: Revision to SDE," Email dated Nov. 24, 1995.
Jeffree, Tony, "Re: VLAN Questions/Suggestions," Email dated May 7, 1996.
Jia, Xiaohua, and So, Shirley Y., "A Multicast Mechanism with Ordering on Overlapping Groups," IEEE, 1993, pp. 242-249.
Joe Francica, "Location-based Services: Where Wireless Meets GIS," retrieved from www.geoplace.com, Jul. 2002.
Karagiannis and Heijeck, "Mobile IP: A State of the Art Report," Ericsson Open Report, Jul. 13, 1999.
Keen, Hal, "Comment on P802.1p/D0," Email dated Oct. 30, 1995.
Kindberg and Barton, "The Cooltown User Experience," Hewlett Packard Laboratories, HPL-2001-22, Feb. 2, 2001.
King, Steven S., "It's an Adventure," Network World, Apr. 10, 1995, pp. 49, 54-55.
King, Steven S., "Switched Virtual Networks—Internetworking Moves Beyond Bridges and Routers," Data Communications, Sep. 1994, pp. 66-80.
King, Steven S., "VLANS Raise Delicate Design Issues," Network World, Apr. 17, 1995, V.12, No. 16, pp. 42-43.
King, Steven, "The Many Faces of Virtual LANs," Network World, Mar. 27, 1995, V.12, No. 13, pp. 59-65.
Klamm, Keith, "Dancing Bears in Readable Text Format," Email dated Mar. 8, 1996.
Knight, Fred S., "Broadband Future Faces Snarls and Gnarls," Business Communications Review, V. 23, No. 12, Dec. 1993, p. 6.
Kompella, Vachaspathi, et al., "Multicast Routing for Multimedia Communication," IEEE/ACM Transactions on Networking, V.1, No. 3, Jun. 1993, pp. 286-292.
Korkea-Aho and Tang, Internet Drraft (May 2001) entitled "Spactial Location Payload," May 2001.
Langille, Paul, "Partitioning of VLAN Tasks," Email dated Nov. 16, 1995.
Langille, Paul, "Re: Revision to SDE," Email dated Nov. 22, 1995.
Langille, Paul, "Re: . . . Re: Revision to SDE," Email dated Nov. 29, 1995.
Lawson, Stephen, "3Com Unveils a Single Solution for Virtual LANs," InfoWorld, May 13, 1996, V.18, No. 20, p. 59.
Lawson, Stephen, "Cabletron Buys Netlink to Fill Out Frame Relay," InfoWorld, Oct. 7, 1996, V.18, No. 41, p. 51.
Lewis, Bob, "Do VLANs Solve Any Real Problems? Lots of People Seem to Think So," InfoWorld, Jun. 17, 1996, V.18, No. 25, p. 91.
Li et al, " A Scalable Location Service for Geographic Ad Hoc Routing," Proceedings of the ACM MOBICOM 2000 Conference.
Liao, Tseng, and Sheu, "GRID: A Fully Location-Aware Routing Protocol for Mobile As Hoc Networks," Telecommunications Systesm, 2001.
Lidinske, Bill, "802.1 Minutes and Document Plan," Mar. 8, 1995.
Lidinsky, Bill "Re: VLAN Ad Hoc Group," Email dated Jun. 12, 1995.
Lidinsky, Bill, "802.1Q Draft PAR," Email dated Dec. 19, 1995.
Lidinsky, Bill, "8021. Interim Mtg VLAN Agenda," Email dated Nov. 1995.
Lidinsky, Bill "IEEE 802 Overall Agenda—Jul. 1996," Email dated Jun. 23, 1996.
Lidinsky, Bill, "Re: 802.?q," Email dated Jun. 21, 1996.
Lidinsky, Bill, "Re: VLAN use of SDE," Email dated Oct. 2, 1995.
Lidinsky, Bill "VLAN use of SDE," Email dated Oct. 1, 1995.
Lindmeyr, Johann, "VLAN Tagging and Clasification," Email dated Nov. 30, 1995.
Lippis, Nick, "Virtual LANs: Real Drawbacks," Data Communications, Nov. 1994, pp. 23-24.
MacLeod, Brian, "1Gbps Ethernet" Email dated Oct. 9, 1995.
Marasli et al., "Partially Reliable Transport Service," Proceedings 2nd IEEE Symp. On Comp. and Comm. (Cat. No. 97TB100137), Proceedings Second IEEE Symposium on Computer and Communications, Alexandria, Egypt, Jul. 1-3, 1997, pp. 648-656, XP002131820.
Marasli et al., "Retransmission-Based Partially Reliable Transport Service: An Analytic Model," Proceedings of INFOCOM, US, Los Alamitos, IEEE Comp. Soc. Press, vol. Conf. 15, 1996, pp. 621-629, XP000621327 (ISBN: 0-8186-7293-5).
Markowsky, George, and Moss, Franklin H., "An Evaluation of Local Path ID Swapping in Computer Networks," IEEE Transactions on Communications, V.Com-29, No. 3, Mar. 1981, pp. 329-336.
Martillo, Joachim, "Re: InterOp Debate," Email thread dated Nov. 6, 1991.
Martillo, Joachim, "Using Wide-Area Point-to-Point Links for Computer Networking," Email thread dated Sep. 1, 1991.
Mathis et al., "TCP Rate-Halving with Bounding Parameters," Pittsburgh Supercomputing Center, Oct. 1996.
Mathis et al., "TCP Selective Acknowledgement options," email message, Oct. 1996.
Mauve and Widmer, "A survey on Position-Based Routing in Mobile Ad Hoc Networks," IEEE Network, Nov./Dec. 2001.
Mayer, Erwin, "An Evaluation Framework for Multicast Ordering Protocols," ACM, 1992, pp. 177-187.
McCarthy, Vance, "Fast Ethernet and VLANs," Datamation, Apr. 1, 1996, V.42, No. 7, p. 13.
McConnell, John, "VLANs Are Here to Stay," Network World, Jul. 1, 1996, p. 37.
McGeough, J., "Location-Based Services and Topology," Jul. 26, 2001.
McGeough, J., "Wireless Location Positioning From Existing Signal Level Data," Dec. 12, 2001.
McGibbon, Alex, "Virtual LANs Come of Age," Telecommunications, Jun. 1996, pp. 48-52.
McGibbon, Alex, "Virtual LANs Come of Age," Telecommunications, Jun. 1996, pp. 48-52.
McKeown, Nick, et al., "The Bay Bridge: A High Speed Bridge/ Router," Protocols for High-Speed Networks, III (C-9), 1992, pp. 203-218.
McKinley, Philip, and Liu, Jane W.S., "Multicast Routing in Bus-Based Computer Networks," IEEE, 1988, pp. 277-287.
McNealis, Martin, "Re: Revision to SDE," Email dated Nov. 17, 1995.
McNealis, Martin, "Virtual LAN Requirements," Cisco Systems, IEEE 802.1 Interim, Oct. 12, 1995.
Merhar, Milan, "Priority Bits Discussion," Email dated Jun. 7, 1996.
Merhar, Milan, "VLAN Questions/Suggestions," Email dated May 7, 1996.
Merhar, Milan, "VLANs and IP Multicast," Email dated May 9, 1996.
Meyer, G., "The PPP Encryption Control Protocol (ECP)," Spider Systems, email message, Jun. 1996.
Miller, Ken, "Broadcast News: Multicasting the WAN," Data Communications, V.24, No. 3, Mar. 1995, pp. 25-26.
MMCNEALIS@CISCO.COM, "1995-The year of the Virtual LAN," IEEE Conference Presentation, Maui, Jul. 1995.
Momirov, Milan, "VLANs and IP Multicast," Email dated May 9, 1996.
Moore, Periakaruppan, and Donohoe, "Where in the World is netgeo. caida.org?" Proc. Internet Soc. Con. (INET), 2000.
Moore, Steve, "Virtual LAN Explainer," Computerworld, Jun. 13, 1994, V.28, No. 24, p. 85.
Moy, John, "MOSPF: Bringing Multicast to Commercial TCP/IP Nets," Network World, V.11, No. 25, Jun. 20, 1994, pp. 11,20.
Moy, John, "Multicast Routing Extensions for OSPF," Communications of the ACM, V.37, No. 8, Aug. 1994, pp. 61-66.
Network Working Group Request for Comments: 1072, "TCP Extensions for long-Delay Paths," Sep. 1997.

Ngoh, L.H., "Multicast Support for Group Communications," Computer Networks and ISDN Systems, 1991, pp. 165-178.

Ngoh, L.H., and Hopkins, T.P., "Transport Protocol Requirements for Distributed Multimedia Information Systems," The Computer Journal, V.32, No. 3, 1989, pp. 252-261.

Niculescu and Nath, "Adhoc Positioning System (APS)," In IEEE GlobeCom, Nov. 2001.

Olsen, Bob, "Up Close: Populating a Virtual LAN," Network World, Oct. 30, 1995, V.12, No. 44, p. 49.

Open Shortest Path First, Inernetworking Technology Overview (1999).

Padmanabhan and Subramanian, "An Investigation of Geographic Mapping Techniques for Internet Hosts," SIGCOMM '01, Aug. 27-31, 2001, San Diego, CA.

Padmanabhan and Subramanian, "Determining the Geographic Locations of Internet Hosts," In Proc. ACM SIGCOMM, Aug. 2001.

Pahlavan and Li, "Indoor Geolocation Science and Technology," IEEE Comminications Magazine, Feb. 2002.

Partridge et al., " A Faster UDP," IEEE/ACM Trans. On Networking, Aug. 1993.

Passmore, David and Freeman, John, "The Virtual LAN Technology Report", Decisys, Inc., May 1996.

Pattavina, Achille, "Design and Performance Evaluation of a Packet Switch for Broadband Central Offices," INFOCOM Dept., University "La Sapienza", Rome, Italy, 1990, pp. 1252-1259.

Paul, Sanjoy, et al., "Multicast Transport Protocols for High Speed Networks," IEEE Apr. 1994, pp. 4-14.

Perlman, Radia, "An Algorithm for Distributed Computation of a Spanning Tree in an Extended LAN," Proceedings -Ninth Data Communications Symposium, Whistler Mountain, British Columbia, Sep. 10-13, 1985.

Perry, Yonadev, "Re: Re: Re: Revision to SDE," Email dated Nov. 27, 1995.

Perry, Yonadev, "Re: Revision to SDE," Email dated Nov. 26, 1995.

Petrosky, Mary, "HUB Shopping Spree," Network World, May 29, 1995.

Polk and Tang, "Spactial Location Server Authentication," Internet Draft (Mar. 2000).

Postel, J. and Reynolds, J., "A Standard for the Transmission of IP Datagrams Over IEEE 802 Networks," Network Working Group—RFC 1042 Memo, Feb. 1988, pp. 1-15.

Priyantha, N., "Providing Precise Indoor Location Information to Mobile Devices," Master's thesis, Massachusetts Institute of Technology, Jan. 2001.

Rajagopalan, Bala, "Reliability and Scaling Issues in Multicast Communication," Computer Communication Review, SIGCOMM 1992 Conference Proceedings, Baltimore, MD, Aug. 17-20, pp. 188-198.

Rand, D., "The PPP Compression Control Protocol (CCP)," Novell, email message, Jun. 1996.

Rijsinghani, Anil, "Minutes From Day 3 of Interim 802.1 Meeting," Email dated Oct. 19, 1995.

Rijsinghani, Anil, "Re: 802.1Q VLAN PAR Backwards Interoperability (802.5/FDDI Coding Issue)," Email dated Jun. 13, 1996.

Rijsinghani, Anil, "Re: VLAN Progress, Tagging, SDE etc.—Just Hold It Please," Email dated Nov. 24, 1995.

Rios, S., "Location Based Services: Interfacing to a Mobile Positioning Center," retrieved from www.wirelessdevnet.com/channels/lbs/features/lbsinterfacing.html, Jun. 2002.

Rivers, Jr, "Re: VLAN Questions/Suggestions," Email dated May 6, 1996.

Rizzo, L., "Issues in the implementation of selective acknoledgements for TCP," email message, Jan. 1996.

Salwen, Howard et al., "Examination of the Applicability of Router and Bridging Techniques," IEEE Network, V.2, No. 1, Jan. 1988, pp. 77-80.

Saunders, Stephen, "Building Virtual LANs on a Real-World Budget," Data Communications, Sep. 21, 1995, pp. 39-40.

Saunders, Stephen, "Making Virtual LANs a Virtual Snap," Data Communications, Jan. 1995, pp. 72-74.

Saunders, Stephen, "Matrix-Based Switching Revs Up the LAN," Data Communications, Mar. 21, 1994, pp. 35-36.

Saunders, Stephen, "Switch Puts Virtual LANs on Automatic Pilot," Data Communications, Sep. 1994, pp. 45-46.

Sayed, Ayman, "Re: Revision to SDE," Email dated Nov. 22, 1995.

Seaman, Mark, "For 802.0—Proposed 802.1 PAR," Email dated May 26, 1995.

Seaman, Mark, "Re: IEEE Plenary—VLANs—802.1 Meeting" Email dated Jul. 4, 1995.

Seaman, Mick, "[Mark Sankey/US/3Com: Gigabit Enet and VLAN]," Email dated Apr. 13, 1996.

Seaman, Mick, "802.1 Interim Meeting—VLANs—Objectives, Contributions, Agenda," Email dated May 3, 1996.

Seaman, Mick, "802.1 Interim on VLANs: Discussion of Requirements," Email dated Oct. 25, 1995.

Seaman, Mick, "802.1 VLAN Interim Meeting—Reminder and Initial Agenda," Email dated Jan. 22, 1996.

Seaman, Mick, "VLAN Progress, Tagging, SDE etc.—Just Hold It Please," Email dated Nov. 22, 1995.

Seamen, Mick, "Foil for Discussion, IEEE 802.1 Closing Plenary," IEEE 802.1 Meeting, Jul. 11, 1996.

Seamn, Mick, "802.1 Agenda, Denver Interim Meeting (VLANs, etc.)," Email dated Jul. 28, 1995.

Seifert, Rich, "Re: Type Field Values," Email dated May 29, 1996.

Seifert, William M., "Bridges and Routers," IEEE Network, V. 2, No. 1, Jan. 1988, pp. 57-64.

Seifert, William M., "Bridges and Routers," IEEE Network, V.2, No. 1, Jan. 1988, pp. 57-64.

Sellers, Philip, "Cabletron Gambling on Virtual LANS," Computing Canada, Apr. 25, 1996, V.22, No. 9, p. 27.

Shah, Himanshu, "Re: 802.1Q VLAN PAR Backwards Interoperability (802.5/FDDI Coding Issue)," Email dated Jun. 14, 1996.

Shimada, K. Karl, "VLAN Classes," IEEE 802.1 Interim Meeting Presentation, Denver CO, Oct. 11-13, 1995, Rising Star Research.

Shimada, K. Karl, "VLAN Definition," IEEE 802.1 Interim Meeting Presentation, Denver CO, Oct. 11-13, 1995, Rising Star Research.

Shimada, K. Karl, "VLAN Requirements," IEEE 802.1 Interim Meeting Presentation, Denver CO, Oct. 11-13, 1995, Rising Star Research.

Shimada, Karl K. "802.1 Interim meeting," Email dated Aug. 22, 1995.

Simpson, W., "The Point-to-Point Protocol (PPP)," Daydreamer, Jul. 1994.

Sincoskie, David W., and Cotton, Charles J., "Extended Bridge Algorithms for Large Networks," IEEE Network, V.2, No. 1, Jan. 1988, pp. 16-24.

Slager, "IEEE 802.1 Opening Plenary Minutes," IEEE 802.1 Meeting, University of Twente, Enschede, Netherlands, Jul. 8, 1996.

Slager, R.V., "Email Voting Ballot: P802.1j/D5: Managed Objects for MAC Bridges—Supplement to IEEE Std. 802.1d", IEEE, Aug. 02, 1995.

Slager, Rosemary V., "IEEE 802.1 (unofficial) VLAN Meeting Minutes," IEEE 802.1 Milpitas, CA, Jan. 24, 25, 1996.

Slager, Rosemary, "802.1 Interim Meeting Minutes," 802.1 Interim Meeting, Wakefield, MA, Jun. 1996.

Slager, Rosemary, "IEEE 802.1 Interim Meeting Minutes," IEEE 802.1 Meeting, Ottawa, Canada, Oct. 2, 1996 through Oct. 4, 1996.

Slager, Rosemary, "June96 Resolutions," Email dated Jun. 7, 1996.

Slager, Rosemary, "Proposed Minutes," Email dated Jun. 19, 1996.

Slofstra, Martin, "Cisco Unveils Multimedia 'Blueprint'," Computing Canada, V.21, No. 7, Mar. 29, 1995, p. 21.

Small, Smailagic and Siewiorek, "Determining User Location for Contect Aware Computing Through the Use of a Wireless LAN Infrastructure," retrieved from http://www.cs.cmu.edu/laura/docdir/small00.pdf, 2003.

Stallings, William, "2.2 Communication Switching," Local Networks, 2nd Ed., 1987, pp. 32-33, 410-416, Macmillan Publishing Company, New York, NY.

Sterkel, Terrance E, "Re: VLAN Progress, Tagging, SDE etc.—Just Hold It Please," Email dated Nov. 23, 1995.

Steve <WITZ@CHIPCOM.COM>, "Re: IP Multicast, Floyd Backes's Presentation, Denver," Email dated Nov. 1, 1995.

Steve <WITZ1961@AOL.COM>, "Default VLAN," Email dated May 7, 1996.

Steve <WITZ1961@AOL.COM>, "Loop Issues," Email dated May 9, 1996.

Steve <WITZ1961@AOL.COM>, "VLAN Questions/Suggestions," Email dated May 6, 1996.
Stevens, W., "TCP Slow Start, Congestion Avoidance, Fast Retransmit, and Fast Recovery Algoriths," NOAO, Jan. 1997.
Strigini, Lorenzo, et al., "Multicast Services on High-Speed Interconnected LANs," Proceedings of the IFIP International Workshop on High Speed Local Area Networks, Feb. 1987, pp. 173-176.
Swedberg, G., "Ericsson's mobile location solutions," Ericsson Review No. 4, 1999.
Tang, Ruuru, and Loughney, Internet Draft (Feb. 14, 2000) entitled "Problems and Requirements of Some IP Applications Based on Spatial Location Information,".
Tannenbaum, Todd, and Conover, Joel, "Managing Your Switched Networks," Network Computing, Jun. 15, 1996.
Tasker, Robin, "Re: Revision to SDE," Email dated Nov. 27, 1995.
TCP Selevtive Acknoledgement option (and related changes) for FreeBSD, Sep. 1997.
Thaler, Pat, "Re: Revision to SDE," Email dated Nov. 27, 1995.
Thompson, Geoff, "Re: Re: Re: Revision to SDE," Email dated Nov. 27, 1995.
TrueSystems.com Inc. "HIPAA & Truesccess," 2001, p. 1.
Vielmetti, Edward et al., "Messages for Dec. 1992," Google Groups: comp.dcom.isdn, Message board thread, Dec. 1992.
Waitzman, D., et al., "Distance Vector Multicast Routing Protocol," Network Working Group—RFC 1075, Nov. 1988, pp. 1-24.
Wakerly, John, "An Efficient Frame-Tagging Format for VLANs," IEEE 802.1 Meeting Presentation, Jan. 24-25, 1996.
Wakerly, John, "FDDI VLAN Frame Format—Two Alternate Interpretations," Email dated Jun. 14, 1996.
Wakerly, John, "Forwarding Methods for VLAN-Tagged Frames in a Bridged LAN," IEEE 802.1 Meeting Presentation, Jan. 24-25, 1996.
Wakerly, John, "Implementation Subgroup Notes," Email dated Oct. 19, 1995, IEEE 802.1 Interim Meeting.
Wakerly, John, "Re: Default VLAN & loops," Email dated May 7, 1996.
Wakerly, John, "Re: Properties of Methods A and B for FDD1 and 802.5 VLAN Frame Format," Email dated Jun. 20, 1996.
Wakerly, John, "Technical Contributions for January Interim Meeting," Email dated Nov. 29, 1995.
Wakerty, John and Cheriton, David R., "Virtual LAN Management Protocol (VLMP)" IEEE 802.1 Meeting, Oct. 11-13, 1995, Alantec.
Wakerty, John, "Some VLAN Styles," IEEE 802.1 Meeting, Oct. 11-13, 1995, Alantec.
Wall, David Wayne, "Mechanisms for Broadcast and Selective Broadcast," Dissertation—Stanford University Graduate Studies, University Microfilms International, Jun. 1980, pp. 1-87.
Walther and Fischer, "LocaPhone—Location-Aware group Communication for Mobile Groups," retrieved from www.isoc.org/isoc/conferences/inet/01/CD_proceedings/T70/walther.pdf, Jul. 2002.
Wang, Peter, et al. "Email Voting Ballots: P802/D21: Overview and Architecture (second edition)," IEEE, Oct. 20, 1995.
Want et al., "The Active Badge Location System," ACM Trans Info. Sys., vol. 10, Jan. 1992.
Ward, Jones and Hopper, "A new Location Technique for the Active Office," IEEE Personal Comm. vol. 4, Oct. 1997.
Warwick, Trevor, "Re: Flow control contribution," Email dated Mar. 14, 1995.
Waters, A.G., "Multicast Provision for High Speed Networks," Proceedings of the IFIP TC6/WG6.4 Fourth International Conference on High Speed Performance Networking, Liege, Belgium, Dec. 14-18, 1992, pp. 317-348.
Waters, Gillian A., et al., "The Use of Broadcast Techniques on the Universe Network," ACM, 1984, pp. 52-57.
Werb and Lanzl, "Designing a Positioning System for Finding Things and People Indoors," IEEE Spectrum, Sep. 1998.
Williamson R., "Introduction to Location based Services for Mobile Wireless Users," Approach to Training Situation Awareness, retrieved from www.ecdesignnet.com/papers/location%20Based%20Services%202002.htm, Jul. 2002.
Wright, Michele, "Re: VLAN Questions/Suggestions," Email dated May 6, 1996.
Wright, Michele, "Re[2]: VLAN Questions/Suggestions," Email dated May 7, 1996.
Written Opinion and Search Report from PCT US99/22919, Jan. 30, 2001 (10 pages).
Written Opinion from PCT/US03/06169, Aug. 13, 2005 (5 pages).
Yang, Henry and Rijsinghani, Anil, "Some VLAN Requirements & Considerations," IEEE 802.1 Maui, Jul. 11, 1995.
Zagami and Parl, "Providing a Universal Location Services Using a Wireless E911 Location Network," IEEE Communications Magazine, Apr. 1998.
Zipf, A., "User-Adaptive Maps for Location-Based Services (LBS) for Tourism," Proc. Of ENTER Comm. Tech in Tourism, Innsbruck Austria, Springer Computer Sciences, 2002.
Zwicker, H.R., "Netzwerke—Die Informationstransporter der Moderne," Elektrotechnik, Jun. 1993.
Bruce Boardman, "Layer 2 Layout: Layer 2 Discovery Digs Deep," Network & Systems Management, Nov. 6, 2003, http://www.networkcomputing.com/article/printFullArticleSrc.jhtml?articleID=16000481 (2 pages).

* cited by examiner

STATUS TRANSMISSION SYSTEM AND METHOD

RELATED APPLICATIONS

This application claims the priority of the following applications, which are herein incorporated by reference: U.S. Provisional Application Ser. No. 60/547,946, entitled, "Methods of Enhanced e911/Emergency Calling Services on a Data Communications Network", filed 26 Feb. 2004; and U.S. Provisional Application Ser. No. 60/552,323, entitled, "Method of System Attribute Announcement and Enhanced Network Policy Service", filed 11 Mar. 2004.

FIELD OF THE DISCLOSURE

This disclosure relates to announcement messaging systems and methods and, more particularly, to network announcement messaging systems and methods.

BACKGROUND

With the advent of Voice-over-Internet-Protocol (i.e., VoIP) telephony, it has become important that data networks be capable of efficiently handling time-sensitive voice traffic. The traditional approaches to ensuring the prioritization of telephony data over traditional network data are often based on the use of various "class of service" and "quality of service" techniques. The class of service/quality of service parameters are typically configured on the network relay devices to which the VoIP endpoint devices (e.g., telephones, handsets, videophones, etc.) are attached. Unfortunately, these configurations are typically static and do not adjust in response to the quantity of VoIP data being generated by the VoIP endpoint devices.

These problems are only compounded when considering emergency calls (e.g., 911 calls), as it is difficult to ensure that emergency calls are handled with a heightened level of urgency within the data network. Unfortunately, VoIP protocols (e.g., H.323 or Session Initiation Protocol) do not readily interact with the network devices through which they are transmitted and, therefore, it is currently difficult to assign a higher level of urgency to emergency calls.

SUMMARY OF THE INVENTION

According to an aspect of this invention, a method includes receiving, on a first network device, an announcement message from an endpoint device connected to the first network device via a network connection. The announcement message, which includes at least one connection criteria, is transmitted to one or more downstream network devices.

One or more of the following features may also be included. The endpoint device may be a VoIP telephony endpoint device. The message may be compliant with a transmission protocol (e.g., 802.1AB link layer discovery protocol). The announcement message received by the first network device may be processed, and at least one traffic policy of the first network device may be configured in accordance with the at least one connection criteria. The announcement message received by the one or more downstream network devices may be processed, and at least one traffic policy of the one or more downstream network devices may be configured in accordance with the at least one connection criteria. The first network device may be chosen from the group consisting of: a switching device; a routing device; a bridge; a gateway; an access point; a repeating device; a signal forwarding device; a packet forwarding device; and a server.

According to another aspect of this invention, an apparatus includes an integrated circuit, such that the integrated circuit is capable of receiving, on a first network device, an announcement message from an endpoint device connected to the first network device via a network connection. The announcement message, which includes at least one connection criteria, is transmitted to one or more downstream network devices.

One or more of the following features may also be included. The endpoint device may be a VoIP telephony endpoint device. The message may be compliant with a transmission protocol (e.g., 802.1AB link layer discovery protocol). The announcement message received by the first network device may be processed, and at least one traffic policy of the first network device may be configured in accordance with the at least one connection criteria. The announcement message received by the one or more downstream network devices may be processed, and at least one traffic policy of the one or more downstream network devices may be configured in accordance with the at least one connection criteria. The first network device may be chosen from the group consisting of: a switching device; a routing device; a bridge; a gateway; an access point; a repeating device; a signal forwarding device; a packet forwarding device; and a server.

According to another aspect of this invention, a computer program product residing on a computer readable medium has a plurality of instructions stored thereon. When executed by the processor, the instructions cause that processor to receive, on a first network device, an announcement message from an endpoint device connected to the first network device via a network connection. The announcement message, which includes at least one connection criteria, is transmitted to one or more downstream network devices.

One or more of the following features may also be included. The endpoint device may be a VoIP telephony endpoint device. The message may be compliant with a transmission protocol (e.g., 802.1AB link layer discovery protocol). The announcement message received by the first network device may be processed, and at least one traffic policy of the first network device may be configured in accordance with the at least one connection criteria. The announcement message received by the one or more downstream network devices may be processed, and at least one traffic policy of the one or more downstream network devices may be configured in accordance with the at least one connection criteria. The first network device may be chosen from the group consisting of: a switching device; a routing device; a bridge; a gateway; an access point; a repeating device; a signal forwarding device; a packet forwarding device; and a server.

The details of one or more implementations are set forth in the accompanying drawings and the description below. Other features and advantages will become apparent from the description, the drawings, and the claims.

DETAILED DESCRIPTION OF THE PREFERRED EMBODIMENTS

Figure 1:
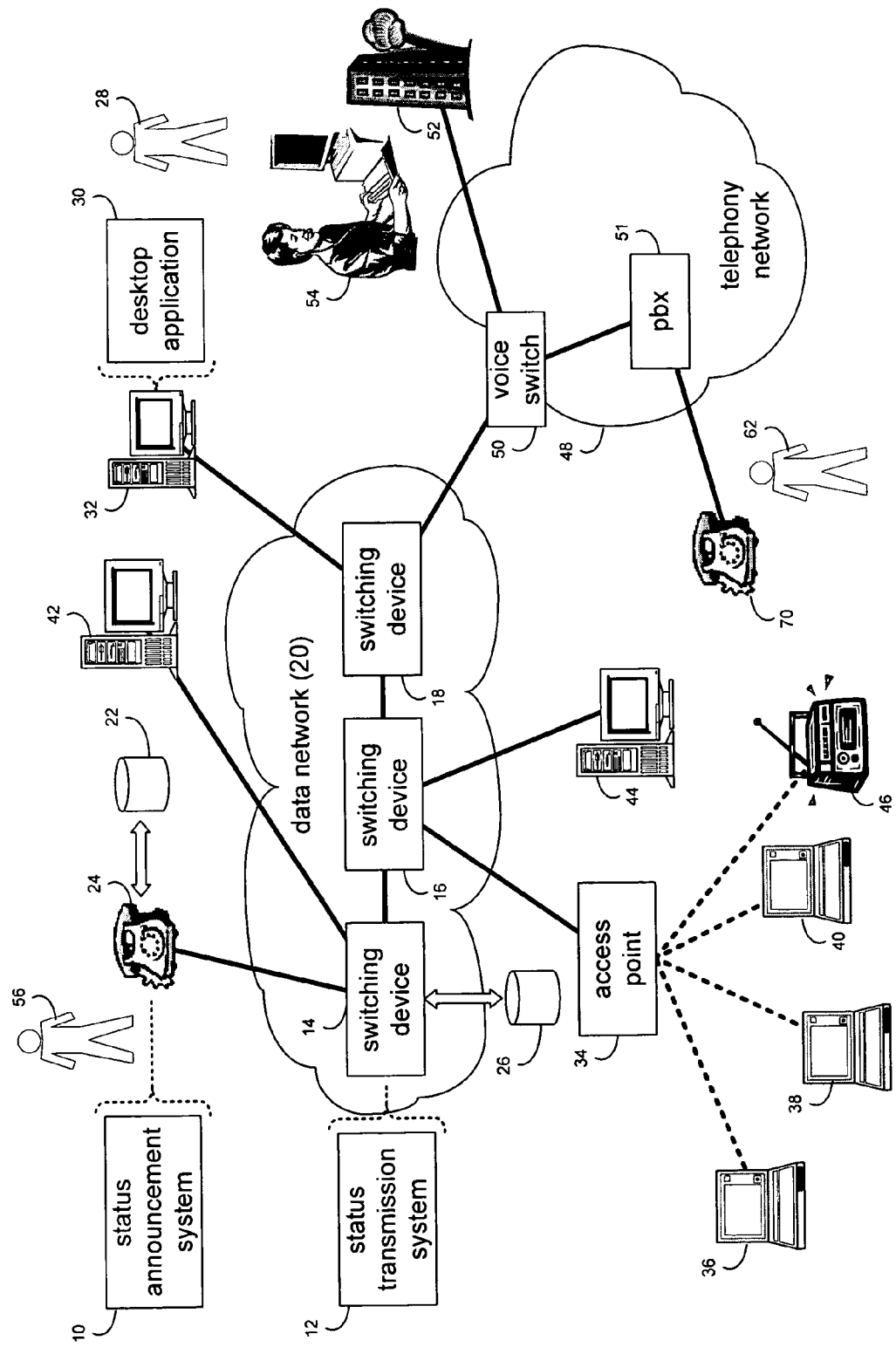
FIG. 1 is a block diagram of a data network including a status transmission system and a status announcement system.
Figure 2:
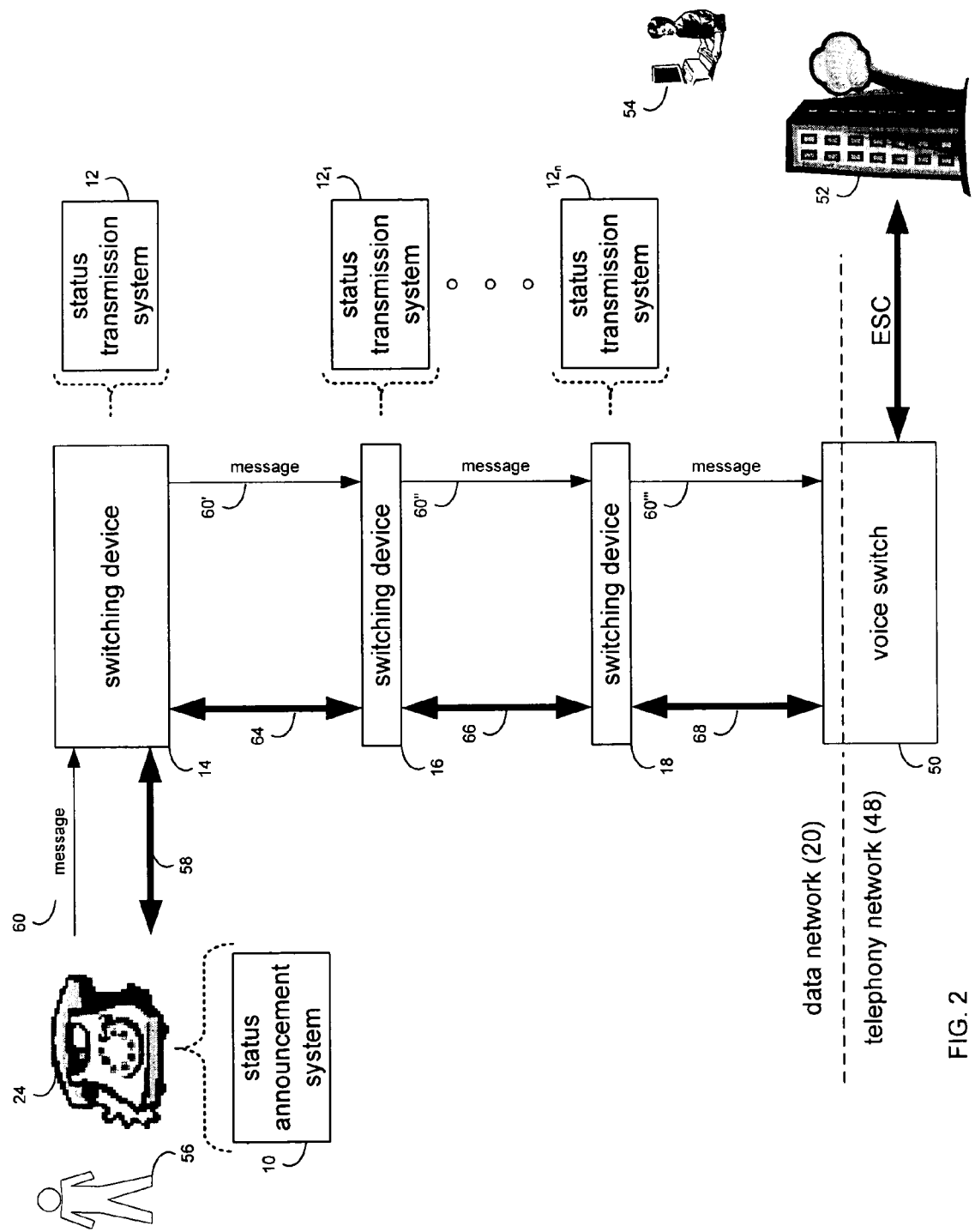
FIG. 2 is a more-detailed view of the status transmission system and the status announcement system of FIG. 1.

Referring to FIGS. 1 & 2, there is shown a status announcement system 10 and a status transmission system 12, each of which transmits messages to network devices (e.g., switching devices 14, 16, 18). A switching device is a device that examines each data packet to determine, from a physical address such as a MAC address, the intended recipient of the data packet.

Status announcement system 10 typically resides on and is executed by one or more endpoint devices (e.g., VoIP telephony endpoint device 24) connected to data network 20 (e.g., a local area network, an intranet, the internet, or some other form of network). The instruction sets and subroutines of status announcement system 10 are typically stored on a storage device 22 connected to one or more endpoint devices. Storage device 22 may be, for example, a hard disk drive, a tape drive, an optical drive, a RAID array, a random access memory (RAM), or a read-only memory (ROM). Alternatively or additionally, status announcement system 10 may be embodied within an integrated circuit incorporated into one or more endpoint devices.

Status transmission system 12 typically resides on and is executed by one or more network devices (e.g., switching device 14) connected to data network 20. As status transmission system 12 may be resident on multiple network devices, multiple instances of status transmission system 12 are represented as status transmission system 12₁ and status transmission system 12ₙ. The instruction sets and subroutines of status transmission system 12 are typically stored on a storage device 26 connected to the one or more network devices. Storage device 26 may be, for example, a hard disk drive, a tape drive, an optical drive, a RAID array, a random access memory (RAM), or a read-only memory (ROM). Alternatively or additionally, status transmission system 12 may be embodied within an integrated circuit incorporated into one or more network devices.

A network administrator 28 typically configures, accesses, and administers status announcement system 10 and/or status transmission system 12 through a desktop application 30 (e.g., Microsoft Internet Explorer™, Netscape Navigator™, SNMP-based (i.e., Simple Network Management Protocol) management tool or a specialized user interface) running on a computer 32 that is also connected to data network 20.

Various network devices may be included within data network 20, such as: a wireless access point (WAP) 34 (i.e., a device that allows for wireless communication of data between access point 34 and one or more computing devices 36, 38, 40); and computers 42, 44, for example. Additional devices include routing devices (not shown); gateway devices (not shown); bridges (not shown), Intrusion Detection Systems (not shown), Intrusion Prevention Systems (not shown), repeaters (not shown), signal forwarding devices (not shown), packet forwarding devices (not shown), attached functions (not shown), and end systems (not shown). Additionally, non-traditional computing devices, such as IP radios 46, may also be connected to data network 20.

Data network 20 may be coupled to a telephone network 48 through a voice switch 50 that converts the packetized data used in VoIP telephone calls to the analog data traditionally used in telephone networks.

Telephone network 48 may include PBX 51 (i.e., private branch exchange), which is a private telephone network used within an enterprise (e.g., an office building). Telephone network 48 may also include a PSAP 52 (i.e., Public Safety Answering Point) that receives emergency telephone calls and routs them to the proper emergency services provider (e.g., fire, police, and ambulance, for example). PSAP 52 is typically staffed by operator 54. An example of PSAP 52 is (in the United States of America) the 911 Emergency Dispatch System.

Figure 3:
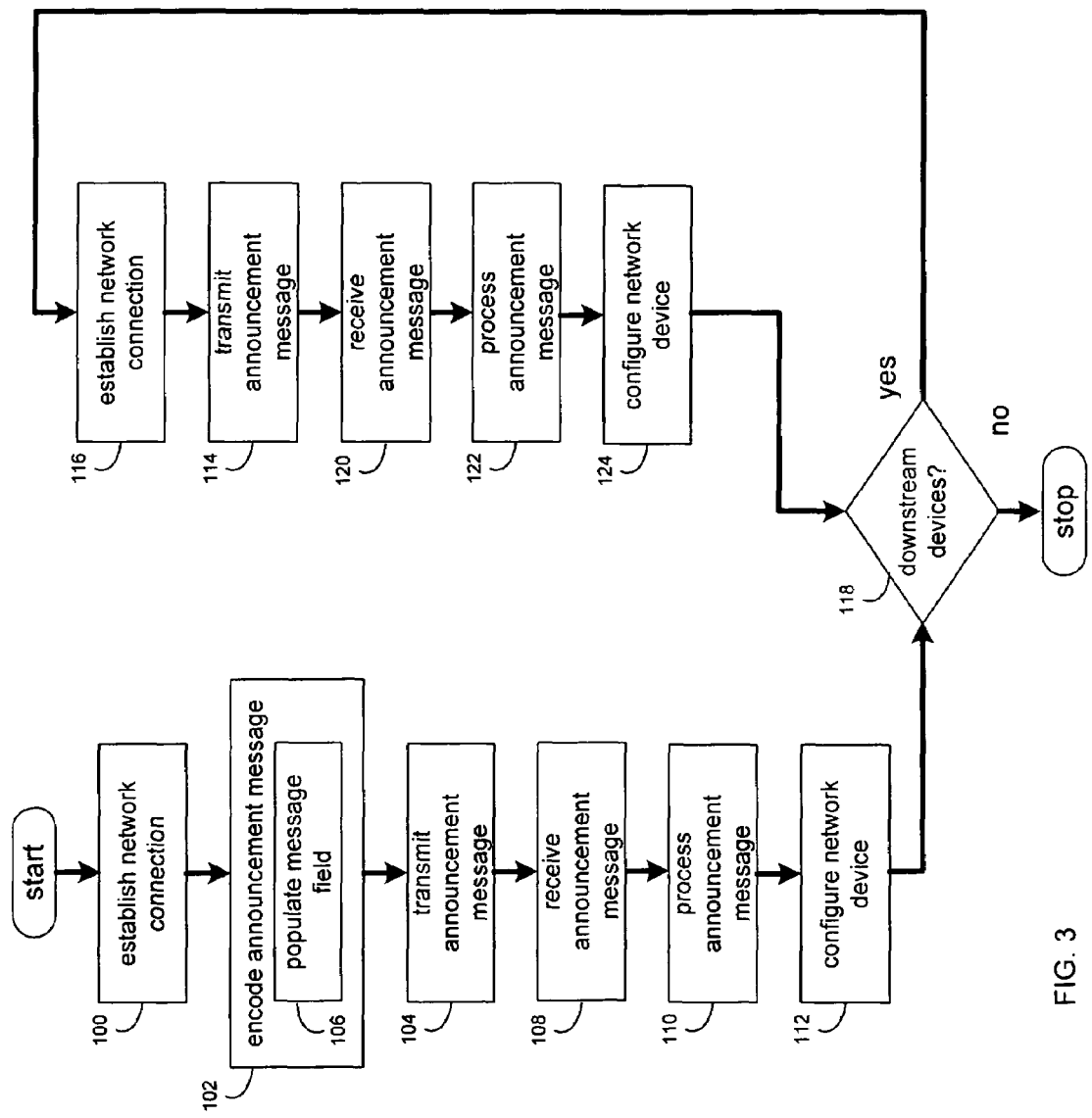
FIG. 3 is a flow chart of the status transmission system and the status announcement system of FIG. 1.

Referring also to FIG. 3 and as discussed above, status announcement system 10 typically resides on and is executed by VoIP telephony endpoint device 24. Examples of VoIP telephony endpoint device 24 include: VoIP telephones; VoIP handsets; hybrid computer/VoIP devices; and VoIP video phones, for example.

When user 56 uses VoIP telephony endpoint device 24 to initiate a voice telephone call, VoIP telephony endpoint device 24 establishes 100 a network connection 58 between switching device 14 and VoIP telephony endpoint device 24. Announcement system 10 encodes 102 an announcement message 60 that is transmitted 104 to switching device 14. Announcement message 60 includes one or more connection criteria (not shown), which typically define the status of the VoIP telephone call.

As discussed above, it is desirable to assign a higher level of priority to VoIP data (as opposed to standard network data), due to the high level of sensitivity that VoIP data has to time delays and packet loss. Accordingly, by announcement message 60 defining the connection 58 between VoIP telephony endpoint device 24 and switching device 14 as a VoIP connection, higher priority will be given to the processing of packets received on the port (not shown) on switching device 14 to which connection 58 is established.

Typically, the encoding 102 and transmission 104 of announcement message 60 is accomplished via a neighbor discovery protocol, such as The Institute of Electrical and Electronics Engineers 802.1ab LLDP (i.e., Link Layer Discovery Protocol).

LLDP defines a standard method for network devices (e.g., switching devices 14, 16, 18, and wireless access point 34) to advertise information about themselves (via announcement messages) to other network devices and to store the information they receive from other network devices. Accordingly, device details (e.g., device configuration, device capabilities, and device identification) can be advertised using LLDP.

Specifically, LLDP defines: a set of common announcement messages; a protocol for transmitting the announcement messages to network devices; and a method for storing the information contained within the announcement messages received from other network devices.

Accordingly and assuming that LLDP is utilized, when user 56 uses VoIP telephony endpoint device 24 to initiate a voice telephone call, announcement system 10 encodes 102 an announcement message 60 that is transmitted 104 to switching device 14. Announcement message 60 (in this example) is an LLDP formatted announcement message that includes a type length value (TLV) field that is modified by announcement system 10 to include a description of the type of voice telephone call being placed. For example, if user 58 is calling her friend 62, as this is a non-emergency call, the TLV field within message 60 will be populated 106 to include the connection criteria "VoIP telephone call". This message 60 is then transmitted 104 to switching device 14. Upon receipt 108 of message 60 by switching device 14, message 60 is processed 110 to extract the connection criteria, which in the example is "VoIP telephone call". Switching device 14 will then configure 112 one or more traffic policies in accordance with this connection criteria. For example, switching device 14 may dynamically configure the buffer queues, the queue scheduler algorithm, and the traffic shaping functions (of switching device 14) to ensure that the bandwidth required is available (to connection 58) to ensure the viability of the VoIP telephone call.

In addition to connection criteria that broadly identifies the telephone call as a "VoIP telephone call", VoIP telephony endpoint device 24 is typically also capable of encoding and transmitting the following announcement messages:

Telephony Endpoint Status Announcement Message: This announcement message provides the status of the telephony endpoint itself (e.g., VoIP telephony endpoint device 24). A telephony endpoint status announcement message can indicate the following status information:
  a. Contact has been made to a telephony controller system (e.g., a soft switch, Internet Protocol PBX, or SIP Proxy, for example);
  b. The telephony endpoint is functional and capable of establishing telephony sessions;
  c. The telephony endpoint has been rejected by a telephony controller system and is not capable of establishing telephony sessions; and
  d. The telephony endpoint is experiencing/has experienced an error condition and may not be capable of functioning properly Telephony Session Announcement Message: This announcement message indicates how many telephony sessions the telephony endpoint is currently participating in.

Telephony Session Status Announcement Message: This announcement message indicates the status of each telephony session that the telephony endpoint is currently participating in. Each telephony session announcement message may include a session identifier that provides a unique identity for a particular telephony session when the telephony endpoint is participating in multiple telephony sessions. A telephony session status announcement message may indicate the following status information:
  a. That telephony session is being established (dialing) from this telephony endpoint to another telephony endpoint;
  b. That a telephony session has been established but is currently on hold;
  c. That a telephony session is ending (i.e., hanging-up); and
  d. That protocol errors have occurred while establishing the telephony session.

Telephony Session Destination Data Link Layer Address Announcement Message: This announcement message makes known the OSI Model Layer 2 "Data Link Layer (MAC)" address of the destination telephony endpoint in a particular telephony session. In applications where the telephony endpoint is participating in more than one telephony session, a session identifier may be included in the announcement message.

Telephony Session Destination Network Layer (Internet Protocol or other type) Address Announcement Message: This announcement message makes known the OSI Model Layer 3 "Network Layer" address of the destination telephony endpoint in a particular telephony session. In applications where the telephony endpoint is participating in more than one telephony session, a session identifier may be included in the announcement message.

Telephony Session Destination Calling Number Announcement Message: This announcement message makes known the telephony calling number of the destination endpoint in a particular telephony session. In applications where the telephony endpoint is participating in more than one telephony session, a session identifier may be included in the announcement message.

Telephony Session Destination Endpoint Name Announcement Message: This announcement message makes known the name of the destination telephony endpoint in a particular telephony session. In applications where the telephony endpoint is participating in more than one telephony session, a session identifier can be included in the announcement message.

CODEC in use for Transmitted Session Announcement Message: This announcement makes known the CODEC technology being used for a telephony session that is being transmitted from the telephony endpoint to a data network relay device (e.g., switching device 14). An example of such a CODEC may include the International Telecommunication Union G.711 CODEC. In applications where the telephony endpoint is participating in more than one telephony session, a session identifier may be included in the announcement message.

Transmitted Telephony Session Bandwidth Announcement Message: This announcement message makes known the bandwidth (e.g., in kilobits per second or megabits per second, for example) being transmitted into the network relay device (e.g., switching device 14) by the telephony endpoint for a telephony session. In applications where the telephony endpoint is participating in more than one telephony session, a session identifier may be included in the announcement message.

Total Bandwidth Transmitted for all Sessions Announcement Message: This announcement message makes known the total bandwidth (i.e., the sum of all sessions) being transmitted into the network relay device (e.g., switching device 14) by the telephony endpoint. This announcement message may be in kilobits per second, or megabits per second, for example.

CODEC in use for Received Session Announcement Message: This announcement message makes known the CODEC technology being used for a telephony session that is being received by the telephony endpoint from the data network relay device (e.g., switching device 14). An example of such a CODEC may include the International Telecommunication Union G.711 CODEC. In applications where the telephony endpoint is participating in more than one telephony session, a session identifier may be included in the announcement message.

Received Telephony Session Bandwidth Announcement Message: This announcement message makes known the bandwidth (e.g., in kilobits per second or megabits per second, for example) being received by the telephony endpoint for the telephony session. In applications where the telephony endpoint is participating in more than one telephony session, a session identifier may be included in the announcement message.

Total Bandwidth Received for all Sessions Announcement Message: This announcement message makes known the total bandwidth (e.g., in kilobits per second or megabits per second, for example) that will be received by the telephony endpoint for all telephony sessions it is currently participating in.

Telephony Session Quality Status Announcement Message: This announcement message allows a telephony endpoint to announce to the data network relay device (e.g., switching device 14) the quality of the specific session between the two telephony endpoints participating in the session. In applications where the telephony endpoint is participating in more than one telephony session, a session identifier may be included in the announcement message.

Transmission Control Protocol Source and Destination Port Pair Value Announcement Message: This announcement message makes known the transmission control protocol source and destination port values associated with a telephony session. In applications where the telephony endpoint is participating in more than one telephony session, a session identifier may be included in the announcement message.

User Datagram Protocol Source and Destination Port Pair Value Announcement Message: This announcement message makes known the user datagram protocol source and destination port values associated with a telephony session. In applications where the telephony endpoint is participating in more than one telephony session, a session identifier may be included in the announcement message.

Telephony Endpoint Password Announcement Message: This announcement message provides a method by which a network relay device (e.g., switching device 14) can make a trust association with a telephony endpoint. A simple text-string password, a message digest string, a digital certificate, or other types of identity verification mechanism may be used with this announcement message. This announcement message is intended to allow a telephony endpoint to authenticate itself and prove (to e.g., switching device 14) that the telephony endpoint is actually a verified telephony endpoint.

Once announcement message 60 is received 108 by switching device 14, switching device 14 may transmit 114 the received announcement message 60 to a downstream network device (e.g., switching devices 16).

For example, upon switching device 14 receiving announcement message 60 from VoIP telephony endpoint device 24, switching device 14 may establish 116 a network connection 64 between switching device 14 and switching device 16. Additionally, switching device 14 may transmit 114 announcement message 60' to the downstream network device (e.g., switching device 16), thus providing the downstream network device with the connection criteria originally encoded within announcement message 60. Announcement message 60' may simply be a retransmission of original announcement message 60, or may be appended/modified to include additional information pertinent to e.g., the network device transmitting announcement message 60'.

The process of establishing 116 network connections and transmitting 114 announcement messages in repeated until telephony network 48 is accessed. For example, each time a connection is established 116 and a message is transmitted 114, a determination 118 is made concerning whether additional downstream network devices need to be notified. If additional downstream network devices are present (and, therefore, telephony network 48 is not yet accessed), the establishing and transmitting process is repeated.

For example, upon receiving 120 announcement message 60' from switching device 14, switching device 16 processes 122 announcement message 60' to extract the connection criteria, which in the example is "VoIP telephone call". Switching device 16 will then configure 124 one or more traffic policies of switching device 16 in accordance with this connection criteria. A determination is made that a downstream network device (i.e., switching device 18) needs to be notified. Accordingly, switching device 16 may establish 116 a network connection 66 between switching device 16 and switching device 18, and may transmit 114 announcement message 60" to switching device 18.

Further, upon receiving 120 announcement message 60" from switching device 16, switching device 18 processes 122 announcement message 60" to extract the connection criteria, which in the example is "VoIP telephone call". Switching device 18 will then configure 124 one or more traffic policies of switching device 18 in accordance with this connection criteria. A determination is made that a downstream network device (i.e., voice switch 50) needs to be notified. Accordingly, switching device 18 may establish 116 a network connection 68 between switching device 18 and voice switch 50, and may transmit 114 announcement message 60''' to voice switch 50.

Additionally, upon receiving 120 announcement message 60''' from switching device 18, voice switch 50 processes 122 announcement message 60''' to extract the connection criteria, which in the example is "VoIP telephone call". Voice switch 50 will then configure 124 one or more traffic policies of voice switch 50 in accordance with this connection criteria. A determination is made that no additional downstream network devices need to be notified, as telephony network 48 has been accessed. The VoIP telephone called is subsequently routed to PBX 51 and (ultimately) telephone 70 (i.e., the telephone used by the recipient of the VoIP telephone call initiated by user 56).

Accordingly, by transmitting the connection criteria throughout data network 20 (via announcement messages 60, 60', 60" and 60'''), all devices between VoIP telephony endpoint device 24 and telephone 70 may be configured to provide a higher level of priority to VoIP data.

As discussed above, it is desirable to assign a higher level of priority to VoIP data (as opposed to standard network data), due to the high level of sensitivity that VoIP data has to time delays and packet loss. Further, it is desirable to apply an even higher level of priority to VoIP data (as opposed to standard network data) when the VoIP data is actually an emergency call (e.g., a 911 call in the United States of America).

Accordingly, assume that user 56 is having chest pains and uses VoIP telephony endpoint device 24 to dial "911", which needs to be routed to PSAP 52 and (ultimately) to operator 54. As discussed above, VoIP telephony endpoint device 24 establishes 100 a network connection 58 between switching device 14 and VoIP telephony endpoint device 24. Announcement system 10 encodes 102 announcement message 60, which is transmitted 104 to switching device 14. However, unlike when user 56 was calling friend 62 and the TLV field within message 60 was populated 106 to include the connection criteria "VoIP telephone call", the TLV field will now be populated 106 to include the connection criteria "Emergency Call in Progress".

Upon receipt 108 of message 60 by switching device 14, message 60 is processed 110 to extract the connection criteria, which in this example is "Emergency Call in Progress". Switching device 14 will then configure 112 one or more traffic policies in accordance with this connection criteria. As discussed above, switching device 14 may dynamically configure the buffer queues, the queue scheduler algorithm, and the traffic shaping functions (of switching device 14) to ensure that the bandwidth required is available to connection 58 to ensure the viability of the VoIP telephone call. Further, as this is an emergency call, more drastic measures may be taken, such as defining that the emergency call (while active) has a mandatory minimum bandwidth (e.g., 128 kilobits per second), even if this mandatory minimum bandwidth occurs at the expense of other standard network data connections and/or other non-emergency VoIP connections.

In addition to connection criteria that broadly identifies the telephone call as a "Emergency Call in Progress", VoIP telephony endpoint device 24 is typically also capable of encoding and transmitting the following emergency announcement messages: (a) the destination data link layer address for the voice switch (e.g., voice switch 50) and/or the PBX (e.g., PBX 51) that is needed to reach PSAP 52; (b) the destination network layer address for the voice switch (e.g., voice switch 50) and/or the PBX (e.g., PBX 51) that is needed to reach PSAP 52; (c) the status of the emergency service call; (d) the E911 location identification number (as defined by ANSI specification T1.628.200); (e) E911 geographic location coordinates (as defined by ANSI specification T1.628.200); and/or (f) the network address of the voice endpoint making the emergency call.

Upon switching device 14 receiving announcement message 60 from VoIP telephony endpoint device 24, switching device 14 may establish 116 a network connection 64 between switching device 14 and switching device 16. Additionally, switching device 14 may transmit 114 announcement message 60' to the downstream network device (e.g., switching device 16), thus providing the downstream network device with the connection criteria originally encoded within announcement message 60. Announcement message 60' may simply be a retransmission of original announcement message 60, or may be appended/modified to include additional information pertinent to e.g., the network device transmitting announcement message 60'.

Upon receiving 120 announcement message 60' from switching device 14, switching device 16 processes 122 announcement message 60' to extract the connection criteria, which in the example is "Emergency Call in Progress". Switching device 16 will then configure 124 one or more traffic policies of switching device 16 in accordance with this connection criteria. A determination is made that a downstream network device (i.e., switching device 18) needs to be notified. Accordingly, switching device 16 may establish 116 a network connection 66 between switching device 16 and switching device 18, and may transmit 114 announcement message 60" to switching device 18.

Further, upon receiving 120 announcement message 60" from switching device 16, switching device 18 processes 122 announcement message 60" to extract the connection criteria, which in the example is "Emergency Call in Progress". Switching device 18 will then configure 124 one or more traffic policies of switching device 18 in accordance with this connection criteria. A determination is made that a downstream network device (i.e., voice switch 50) needs to be notified. Accordingly, switching device 18 may establish 116 a network connection 68 between switching device 18 and voice switch 50, and may transmit 114 announcement message 60''' to voice switch 50.

Additionally, upon receiving 120 announcement message 60''' from switching device 18, voice switch 50 processes 122 announcement message 60''' to extract the connection criteria, which in the example is "Emergency Call in Progress". Voice switch 50 will then configure 124 one or more traffic policies of voice switch 50 in accordance with this connection criteria. A determination is made that no additional downstream network devices need to be notified, as telephony network 48 has been accessed. The VoIP telephone called is subsequently routed to PSAP 52 and (ultimately) operator 54.

Accordingly, by transmitting the "Emergency Call in Progress" connection criteria throughout data network 20 (via announcement messages 60, 60', 60" and 60'''), all devices between VoIP telephony endpoint device 24 and PSAP 52 may be configured to provide a higher level of priority to the "Emergency Call in Progress" VoIP data.

While the system is described above as dynamically configuring the buffer queues, the queue scheduler algorithm, and the traffic shaping functions in accordance with the connection criteria, other policies may also be configured. For example, other configurable policies include:

Filter Policy: This policy provides the system with the ability to filter messages. This Filter action may be pre-defined or dynamically created and may be applied to single or multiple interfaces.

Access Control List Creation Policy: This Policy creates a router access control list that is used to "filter" communications messages transiting through a routing system.

Route Map Policy: This policy defines a route map for a specific traffic type. A policy route map directs traffic out of specific interfaces regardless of what would normally occur during the normal operation of a device. In a routing device, a route map policy would forward communications messages to an interface other than the ones expected to be used as calculated by the dynamic routing protocol.

VLAN Containment Policy: This policy would provision a network ingress device to map all traffic matching a set of characteristics. This policy is useful in that it could map all traffic from a source to a specific or specialized network.

802.1X Un-Authenticate/Virtual Port Close Policy: This policy would provision a system to un-authenticate a previously authorized connection. This policy would "close the virtual port" associated with the 802.1X authenticator process existing in the communications device. This policy would effectively filter all traffic that ingresses into the communications system for the port or ports where this policy is being provisioned.

802.11 Disassociate Policy: This policy would instruct a wireless access point to disassociate a particular 802.11 client function from a particular access point of channel frequency. This policy would effectively disconnect a wireless client from the communications network.

802.11 Associate Channel Only Policy: This policy would instruct an 802.11 or wireless infrastructure to only allow a particular wireless client function to only associate (allow to connect) to a specified channel frequency. This policy would allow a wireless network to steer a wireless client function to a specific network.

Bandwidth Rate Shape/Limit Bandwidth Policy: This policy would enable a mechanism that limits the amount of bandwidth over a period of time (shape) or to a peak value (limit). The Analysis Function can specify bandwidth levels dynamically.

Traffic Surveillance Policy: This policy would enable the network system to "mirror" traffic to a monitor port for further forensic analysis by additional functions. A mirror or surveillance function is a mechanism to replicate communications messages to an additional interface or external system for additional analysis while still allowing it to be forwarded through the normal interface that would be configured for normal operation.

Flow Creation Rate Dampening Policy: This policy affects systems that are aware of communications flows. A Flow is a logical representation of a conversation between two or more systems on the communications network. A basic flow is tracked as a conversation between two OSI Layer 2 or Layer 3 addresses or simply between two or more ports. A Flow Creation Rate Dampening policy would limit the creation rate of new flows from a particular source, or to a specific destination, or based on certain characteristics such as TCP or UDP port number.

Maximum Flows Allowed Policy: This policy would limit the number of Flows to a system, from a system or between systems based on characteristics such as TCP/UDP port number as provisioned by the Analysis Function.

While the system is described above as processing VoIP telephone calls, other configurations are possible. For example, the above-described system may be utilized whenever the data stream is time sensitive. For example, while delays in loading web pages are acceptable, delays in video streams and/or audio streams often result in fractured playback. Therefore, the above-described system may be utilized to prioritize the processing of all streaming data (as opposed to only VoIP data)

A number of implementations have been described. Nevertheless, it will be understood that various modifications may be made. Accordingly, other implementations are within the scope of the following claims.

What is claimed is:

1. A method comprising:
receiving, on a first network device, an announcement message from an endpoint device connected to the first network device via a first network connection, wherein the announcement message includes at least one connection criteria;
modifying the announcement message to include information associated with the first network device;
configuring at least one traffic policy of the first network device in accordance with the at least one connection criteria, wherein the at least one traffic policy is associated with a second network connection; and
transmitting the modified announcement message to one or more downstream network devices.

2. The method of claim 1 wherein the endpoint device is a VoIP telephony endpoint device.

3. The method of claim 1 wherein the announcement message is in conformance with an 802.1AB link layer discovery protocol.

4. The method of claim 1 further comprising:
processing the modified announcement message received by the one or more downstream network devices; and
configuring at least one traffic policy of the one or more downstream network devices in accordance with the at least one connection criteria.

5. The method of claim 1 wherein the first network device is chosen from the group consisting of: a switching device; a routing device; a bridge; a gateway; an access point; a repeating device; a signal forwarding device; a packet forwarding device; and a server.

6. An apparatus comprising an integrated circuit, wherein the integrated circuit is capable of:
receiving, on a first network device, an announcement message from an endpoint device connected to the first network device via a first network connection, wherein the announcement message includes at least one connection criteria;
modifying the announcement message to include information associated with the first network device;
configuring at least one traffic policy of the first network device in accordance with the at least one connection criteria, wherein the at least one traffic policy is associated with a second network connection; and
transmitting the modified announcement message to one or more downstream network devices.

7. The apparatus of claim 6 wherein the endpoint device is a VoIP telephony endpoint device.

8. The apparatus of claim 6 wherein the announcement message is in conformance with an 802.1AB link layer discovery protocol.

9. The apparatus of claim 6 wherein the integrated circuit is further capable of:
processing the modified announcement message received by the one or more downstream network devices; and
configuring at least one traffic policy of the one or more downstream network devices in accordance with the at least one connection criteria.

10. The apparatus of claim 6 wherein the first network device is chosen from the group consisting of: a switching device; a routing device; a bridge; a gateway; an access point; a repeating device; a signal forwarding device; a packet forwarding device; and a server.

11. A computer program product residing on a computer readable medium having a plurality of instructions stored thereon which, when executed by the processor, cause that processor to:
receive, on a first network device, an announcement message from an endpoint device connected to the first network device via a first network connection, wherein the announcement message includes at least one connection criteria;
modify the announcement message to include information associated with the first network device;
configure at least one traffic policy of the first network device in accordance with the at least one connection criteria, wherein the at least one traffic policy is associated with a second network connection; and
transmit the modified announcement message to one or more downstream network devices.

12. The computer program product of claim 11 wherein the endpoint device is a VoIP telephony endpoint device.

13. The computer program product of claim 11 wherein the announcement message is in conformance with an 802.1AB link layer discovery protocol.

14. The computer program product of claim 11 further comprising instructions for:
processing the modified announcement message received by the one or more downstream network devices; and
configuring at least one traffic policy of the one or more downstream network devices in accordance with the at least one connection criteria.

15. The computer program product of claim 11 wherein the first network device is chosen from the group consisting of: a switching device; a routing device; a bridge; a gateway; an access point; a repeating device; a signal forwarding device; a packet forwarding device; and a server.

16. The method of claim 1 wherein the information associated with the first network device includes one or more of: configuration information, status information, and policy information.

17. The method of claim 1 wherein the information associated with the first network device further includes one or more of: network configuration information and network status information.

18. The method of claim 1 further comprising:
forwarding packets based, at least in part, upon the at least one traffic policy.

19. The apparatus of claim 6 wherein the information associated with the first network device includes one or more of: configuration information, status information, and policy information.

20. The apparatus of claim 6 wherein the information associated with the first network device further includes one or more of: network configuration information and network status information.

21. The apparatus of claim 6 wherein the integrated circuit is further capable of:

forwarding packets based, at least in part, upon the at least one traffic policy.

22. The computer program product of claim 21 wherein the information associated with the first network device includes one or more of: configuration information, status information, and policy information.

23. The computer program product of claim 21 wherein the information associated with the first network device further includes one or more of: network configuration information and network status information.

24. The computer program product of claim 21 further comprising instructions for:

forwarding packets based, at least in part, upon the at least one traffic policy.

* * * * *